(12) United States Patent
Albertson et al.

(10) Patent No.: US 9,412,011 B2
(45) Date of Patent: Aug. 9, 2016

(54) WARNING A USER ABOUT ADVERSE BEHAVIORS OF OTHERS WITHIN AN ENVIRONMENT BASED ON A 3D CAPTURED IMAGE STREAM

(71) Applicant: INTERNATIONAL BUSINESS MACHINES CORPORATION, Armonk, NY (US)

(72) Inventors: Jacob C. Albertson, Newton, MA (US); Kenneth C. Arnold, Ellicott City, MD (US); Steven D. Goldman, Chesterfield, MO (US); Michael A. Paolini, Austin, TX (US); Anthony J. Sessa, Quogue, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/962,761

(22) Filed: Dec. 8, 2015

(65) Prior Publication Data
US 2016/0092725 A1    Mar. 31, 2016

Related U.S. Application Data

(63) Continuation of application No. 13/370,004, filed on Feb. 9, 2012, now Pat. No. 9,208,678, which is a continuation of application No. 11/622,676, filed on Jan. 12, 2007, now Pat. No. 8,269,834.

(51) Int. Cl.
*G06F 15/18*    (2006.01)
*G06K 9/00*    (2006.01)
(Continued)

(52) U.S. Cl.
CPC ........ *G06K 9/00335* (2013.01); *G06K 9/00771* (2013.01); *G06T 7/2093* (2013.01);
(Continued)

(58) Field of Classification Search
CPC ............. G08B 13/19613; G08B 31/00; G08B 13/19641; G08B 13/19602; G08B 13/19608; G08B 13/19615; G08B 13/19643; G08B 13/19697; G08B 21/0432; G08B 21/043; G08B 21/0476; G06K 9/00771; G06K 9/00335; H04N 7/188; H04N 7/181; Y10S 706/933; G06T 2207/20076; G06T 2207/20081; G06T 2207/30232; G06T 2207/10028; G01V 5/0008; G06F 9/4443; G06B 6/00
USPC ............... 348/152, 143, 161; 340/506, 573.1; 382/103, 107, 190; 706/14
See application file for complete search history.

(56) References Cited

U.S. PATENT DOCUMENTS 4,737,847 A    4/1988    Araki et al.
5,019,780 A    5/1991    Bailey
(Continued)

FOREIGN PATENT DOCUMENTS

CN    1655197 A    8/2005
CN    2008103425    7/2008
(Continued)

OTHER PUBLICATIONS

Office Action, mailing date Mar. 23, 2015, U.S. Appl. No. 13/370,004, filed Feb. 9, 2012, In re Albertson, 203 pages.
(Continued)

*Primary Examiner* — Daniel C Murray
(74) *Attorney, Agent, or Firm* — Joe Petrokaitis; Amy J. Pattillo

(57) ABSTRACT

A tactile feedback output device receives one or more warning signals for controlling one or more types of tactile output by the one or more tactile feedback output devices, the one or more warning signals representing that a predicted behavior of a monitored user represents a particular behavior that is potentially adverse and a percentage probability that the predicted behavior is adverse, the monitored user detected within a particular environment monitored by a supervising user, the one or more tactile feedback output devices worn by the supervising user.

20 Claims, 7 Drawing Sheets

(51) Int. Cl.

| | | |
|---|---|---|
| *G06K 9/46* | (2006.01) | |
| *G08B 23/00* | (2006.01) | |
| *G08B 29/00* | (2006.01) | |
| *H04N 7/18* | (2006.01) | |
| *G06T 7/20* | (2006.01) | |
| *G08B 6/00* | (2006.01) | |

(52) U.S. Cl.
CPC ................ *G08B 6/00* (2013.01); *H04N 7/181* (2013.01); *G06T 2207/10028* (2013.01); *G06T 2207/20076* (2013.01); *G06T 2207/20081* (2013.01); *G06T 2207/30232* (2013.01)

(56) References Cited

U.S. PATENT DOCUMENTS

| | | |
|---|---|---|
| 5,103,305 A | 4/1992 | Watanabe |
| 5,109,425 A | 4/1992 | Lawton |
| 5,283,644 A | 2/1994 | Maeno |
| 5,406,491 A | 4/1995 | Lima |
| 5,454,043 A | 9/1995 | Freeman |
| 5,502,803 A | 3/1996 | Yoshida et al. |
| 5,581,276 A | 12/1996 | Cipolla et al. |
| 5,666,157 A | 9/1997 | Aviv |
| 5,691,693 A | 11/1997 | Kithil |
| 5,714,698 A | 2/1998 | Tokioka et al. |
| 5,747,719 A | 5/1998 | Bottesch |
| 5,774,591 A | 6/1998 | Black et al. |
| 5,777,720 A | 7/1998 | Shapiro et al. |
| 5,880,731 A | 3/1999 | Liles et al. |
| 5,907,293 A | 5/1999 | Tognazzini |
| 5,930,378 A | 7/1999 | Kubota et al. |
| 6,002,808 A | 12/1999 | Freeman |
| 6,028,626 A | 2/2000 | Aviv |
| 6,035,053 A | 3/2000 | Yoskioka et al. |
| 6,049,747 A | 4/2000 | Nakajima et al. |
| 6,072,494 A | 6/2000 | Nguyen |
| 6,080,938 A | 6/2000 | Lutz |
| 6,115,053 A | 9/2000 | Perlin |
| 6,154,558 A | 11/2000 | Hsieh |
| 6,167,381 A | 12/2000 | Swaine et al. |
| 6,181,343 B1 | 1/2001 | Lyons |
| 6,189,790 B1 | 2/2001 | Walter |
| 6,212,510 B1 | 4/2001 | Brand |
| 6,215,890 B1 | 4/2001 | Matsuo et al. |
| 6,256,046 B1 | 7/2001 | Waters et al. |
| 6,295,367 B1 | 9/2001 | Crabtree et al. |
| 6,301,370 B1 | 10/2001 | Steffens et al. |
| 6,421,453 B1 | 7/2002 | Kanevsky et al. |
| 6,526,161 B1 | 2/2003 | Yan |
| 6,540,674 B2 | 4/2003 | Zadrozny et al. |
| 6,577,937 B1 | 6/2003 | Shuman |
| 6,584,375 B2 | 6/2003 | Bancroft et al. |
| 6,633,315 B1 | 10/2003 | Sobeski et al. |
| 6,674,877 B1 | 1/2004 | Jojic et al. |
| 6,678,413 B1 | 1/2004 | Liang et al. |
| 6,766,036 B1 | 7/2004 | Pryor |
| 6,784,901 B1 | 8/2004 | Harvey et al. |
| 6,788,809 B1 | 9/2004 | Grzeszczuk et al. |
| 6,804,396 B2 | 10/2004 | Higaki et al. |
| 6,859,144 B2 | 2/2005 | Newman et al. |
| 6,975,246 B1 | 12/2005 | Trudeau |
| 7,036,094 B1 | 4/2006 | Cohen et al. |
| 7,039,676 B1 | 5/2006 | Day et al. |
| 7,058,204 B2 | 6/2006 | Hildreth et al. |
| 7,068,842 B2 | 6/2006 | Liang et al. |
| 7,068,843 B2 | 6/2006 | Chang et al. |
| 7,100,818 B2 | 9/2006 | Swaine |
| 7,110,569 B2 | 9/2006 | Brodsky et al. |
| 7,126,496 B2 | 10/2006 | Greene |
| 7,171,024 B2 | 1/2007 | Crabtree |
| 7,209,588 B2 | 4/2007 | Liang et al. |
| 7,224,830 B2 | 5/2007 | Nefian et al. |
| 7,239,239 B2 | 7/2007 | Dobler et al. |
| 7,274,800 B2 | 9/2007 | Nefian et al. |
| 7,284,201 B2 | 10/2007 | Cohen-Solal |
| 7,292,723 B2 | 11/2007 | Tedesco et al. |
| 7,296,236 B2 | 11/2007 | King |
| 7,340,077 B2 | 3/2008 | Gokturk et al. |
| 7,378,658 B2 | 5/2008 | Mueller et al. |
| 7,386,151 B1 | 6/2008 | Moritz |
| 7,408,461 B2 | 8/2008 | Fluck |
| 7,409,373 B2 | 8/2008 | Knagenhjelm |
| 7,433,493 B1 | 10/2008 | Miyoshi et al. |
| 7,463,157 B2 | 12/2008 | Victor et al. |
| 7,519,970 B2 | 4/2009 | Jones et al. |
| 7,596,260 B2 | 9/2009 | Tedesco et al. |
| 7,602,945 B2 | 10/2009 | Kubo et al. |
| 7,636,456 B2 | 12/2009 | Collins et al. |
| 7,653,213 B2 | 1/2010 | Longhurst et al. |
| 7,683,929 B2 | 3/2010 | Elazar et al. |
| 7,720,610 B2 | 5/2010 | Bergfalk et al. |
| 7,725,547 B2 | 5/2010 | Albertson et al. |
| 7,729,532 B2 | 6/2010 | Tedesco et al. |
| 7,792,328 B2 | 9/2010 | Albertson et al. |
| 7,817,824 B2 | 10/2010 | Liang et al. |
| 7,821,531 B2 | 10/2010 | Yoda et al. |
| 7,840,031 B2 | 11/2010 | Albertson et al. |
| 7,970,176 B2 | 6/2011 | Kutliroff et al. |
| 7,971,156 B2 | 6/2011 | Albertson et al. |
| 7,996,793 B2 | 8/2011 | Latta et al. |
| 8,005,675 B2 | 8/2011 | Wasserblat et al. |
| 8,009,193 B2 | 8/2011 | Zhou et al. |
| RE42,690 E | 9/2011 | Aviv |
| 8,013,729 B2 | 9/2011 | Buehler |
| 8,081,817 B2 | 12/2011 | Tedesco et al. |
| 8,345,963 B2 | 1/2013 | Tedesco et al. |
| 8,401,233 B2 | 3/2013 | Tedesco et al. |
| 8,587,662 B1 | 11/2013 | Moll et al. |
| 8,804,997 B2 | 8/2014 | Gagvani et al. |
| 8,823,804 B2 | 9/2014 | Haering et al. |
| 8,824,784 B2 | 9/2014 | Tedesco et al. |
| 8,847,781 B2 | 9/2014 | Masli et al. |
| 2002/0004629 A1 | 1/2002 | Natori |
| 2002/0085033 A1 | 7/2002 | Robinson et al. |
| 2002/0107741 A1 | 8/2002 | Stern et al. |
| 2002/0118880 A1 | 8/2002 | Liu et al. |
| 2002/0152010 A1 | 10/2002 | Colmenarez |
| 2002/0178440 A1 | 11/2002 | Agnihotri et al. |
| 2003/0026461 A1 | 2/2003 | Arthur Hunter |
| 2003/0058111 A1 | 3/2003 | Lee et al. |
| 2003/0076300 A1 | 4/2003 | Lauper |
| 2003/0081834 A1 | 5/2003 | Philomin et al. |
| 2003/0113018 A1 | 6/2003 | Nefian |
| 2003/0126013 A1 | 7/2003 | Shand |
| 2003/0142068 A1 | 7/2003 | DeLuca |
| 2003/0153817 A1 | 8/2003 | Knagenhjelm |
| 2003/0156756 A1 | 8/2003 | Gokturk |
| 2003/0227453 A1 | 12/2003 | Beier et al. |
| 2003/0234347 A1 | 12/2003 | Akagi |
| 2004/0001616 A1 | 1/2004 | Gutta et al. |
| 2004/0004635 A1 | 1/2004 | King |
| 2004/0032970 A1 | 2/2004 | Kiraly |
| 2004/0098298 A1 | 5/2004 | Yin |
| 2004/0131254 A1 | 7/2004 | Liang et al. |
| 2004/0141635 A1 | 7/2004 | Liang et al. |
| 2004/0141636 A1 | 7/2004 | Liang et al. |
| 2004/0161132 A1 | 8/2004 | Cohen et al. |
| 2004/0161133 A1 | 8/2004 | Elazar et al. |
| 2004/0190767 A1 | 9/2004 | Tedesco et al. |
| 2004/0193313 A1 | 9/2004 | Cornet et al. |
| 2004/0228503 A1 | 11/2004 | Cutler |
| 2004/0240542 A1 | 12/2004 | Yeredor et al. |
| 2005/0030184 A1 | 2/2005 | Victor |
| 2005/0069852 A1 | 3/2005 | Janakiraman et al. |
| 2005/0071853 A1 | 3/2005 | Jones et al. |
| 2005/0083184 A1 | 4/2005 | Bos et al. |
| 2005/0128304 A1 | 6/2005 | Manasseh et al. |
| 2005/0157908 A1 | 7/2005 | Matsugu et al. |
| 2005/0166163 A1 | 7/2005 | Chang |
| 2005/0206610 A1 | 9/2005 | Cordelli |
| 2005/0210419 A1 | 9/2005 | Kela et al. |
| 2006/0013440 A1 | 1/2006 | Cohen |
| 2006/0040679 A1 | 2/2006 | Shikano et al. |

(56) References Cited

U.S. PATENT DOCUMENTS

| | | | |
|---|---|---|---|
| 2006/0045310 | A1 | 3/2006 | Tu et al. |
| 2006/0067573 | A1 | 3/2006 | Parr et al. |
| 2006/0071817 | A1 | 4/2006 | Greene |
| 2006/0097857 | A1 | 5/2006 | Osaka et al. |
| 2006/0098089 | A1 | 5/2006 | Sofer |
| 2006/0098737 | A1 | 5/2006 | Sethuraman et al. |
| 2006/0181518 | A1 | 8/2006 | Shen et al. |
| 2006/0181519 | A1 | 8/2006 | Vernier et al. |
| 2006/0182346 | A1 | 8/2006 | Yoda et al. |
| 2006/0203090 | A1 | 9/2006 | Wang et al. |
| 2006/0210112 | A1 | 9/2006 | Cohen et al. |
| 2009/0274339 | A9 | 9/2006 | Cohen et al. |
| 2006/0239545 | A1 | 10/2006 | Tedesco et al. |
| 2006/0239546 | A1 | 10/2006 | Tedesco et al. |
| 2007/0041058 | A1 | 2/2007 | Disatnik et al. |
| 2007/0063855 | A1 | 3/2007 | Maass |
| 2007/0067203 | A1 | 3/2007 | Gil et al. |
| 2007/0070213 | A1 | 3/2007 | Tedesco et al. |
| 2007/0097234 | A1 | 5/2007 | Katayama |
| 2007/0175406 | A1 | 8/2007 | Liang et al. |
| 2007/0235652 | A1 | 10/2007 | Smith |
| 2008/0004950 | A1 | 1/2008 | Huang et al. |
| 2008/0022365 | A1 | 1/2008 | Chae et al. |
| 2008/0040692 | A1 | 2/2008 | Sunday et al. |
| 2008/0065468 | A1 | 3/2008 | Berg et al. |
| 2008/0068187 | A1 | 3/2008 | Bonefas et al. |
| 2008/0084345 | A1 | 4/2008 | Rougas et al. |
| 2008/0136631 | A1 | 6/2008 | Fluck |
| 2008/0143895 | A1 | 6/2008 | Peterka et al. |
| 2008/0166015 | A1 | 7/2008 | Haering et al. |
| 2008/0169914 | A1 | 7/2008 | Albertson et al. |
| 2009/0022362 | A1 | 1/2009 | Gagvani et al. |
| 2009/0285452 | A1 | 11/2009 | Liang et al. |
| 2009/0296992 | A1 | 12/2009 | Liang et al. |
| 2010/0045797 | A1 | 2/2010 | Schofield et al. |
| 2010/0169792 | A1 | 7/2010 | Ascar et al. |
| 2010/0312446 | A1 | 12/2010 | Schofield et al. |
| 2011/0007946 | A1 | 1/2011 | Liang et al. |
| 2011/0173146 | A1 | 7/2011 | Hnatio |
| 2011/0212770 | A1 | 9/2011 | Ocko et al. |
| 2011/0286638 | A1 | 11/2011 | Tedesco et al. |
| 2012/0056742 | A1 | 3/2012 | Tedesco et al. |
| 2012/0140042 | A1 | 6/2012 | Albertson et al. |
| 2012/0143649 | A1 | 6/2012 | Aubertin |
| 2012/0268594 | A1 | 10/2012 | Haering et al. |
| 2012/0271785 | A1 | 10/2012 | Albertson et al. |
| 2013/0144976 | A1 | 6/2013 | Tedesco et al. |
| 2014/0341433 | A1 | 11/2014 | Haering et al. |

FOREIGN PATENT DOCUMENTS

| | | |
|---|---|---|
| EP | 0905644 A | 3/1999 |
| EP | 0991011 A | 4/2000 |
| EP | 1723901 | 11/2006 |
| FR | 2784887 | 4/2000 |
| JP | 4165498 A | 6/1992 |
| JP | 2004-328622 A | 11/2004 |
| JP | 2005-315802 A | 11/2005 |
| JP | 2005309965 A | 11/2005 |
| JP | 2006-127240 A | 5/2006 |
| JP | 2006-165729 A | 6/2006 |
| JP | 2008-083933 A | 4/2008 |
| JP | 20080003174 | 8/2008 |
| TW | 484105 B | 4/2002 |
| TW | 200523728 | 7/2005 |
| TW | 20080100893 | 11/2008 |
| WO | 0002187 | 1/2000 |
| WO | 2004108466 | 12/2004 |
| WO | 2005027023 A1 | 3/2005 |

OTHER PUBLICATIONS

Notice of Allowance, mailing date, Jul. 30, 2015, U.S. Appl. No. 13/370,004, filed Feb. 9, 2012, In re Albertson, 47 pages.

Wikipedia, "Total Recall (1990 film)", written by Philip K. Dick, Ronald Shusett, Dan O'Bannon, Gary Goldman, Jun. 1, 1990; (Subway scene where concealed weapon carried by Quad is detected and highlighted by the security panel.).

Wikipedia, "The Terminator", written by James Cameron, Gale Anne Hurd, 26OCT1984, T-800 HUD (image overlays or threat assessment, etc.).

Wikipedia, "Terminator 2: Judgement Day", written by James Cameron, William Wisher, Jul. 1, 1993, T-800 HUD image overlays for threat assessment, etc.).

Terminator Wiki, "Head-up Display", pages all, T-800 HUD (image overlays for threat assessment, etc.), Accessed Mar. 17, 2015, http://terminator.wikia.com/wikilHead-up_display.

Wikipedia, "Robocop", written by Edward Neumeier, Michael Mine, Jul. 17, 1987, Robocop HUD (image overlays for threat assessment, etc).

Final Office Action, U.S. Appl. No. 11/622,696, filed Jan. 12, 2007, In re Albertson, mailing date Mar. 18, 2013, 39 pages.

Office Action, U.S. Appl. No. 13/543,476, filed Jul. 6, 2012, In re Albertson, mailing date Mar. 18, 2013, 75 pages.

Notice of Allowance, U.S. Appl. No. 13/543,476, filed Jul. 6, 2012, In Re Jacob E Albertson, International Business Machines Corporation, mailed Jun. 25, 2013, 24 pages.

Notice of Allowance, U.S. Appl. No. 11/622,679, filed Jan. 12, 2007, Jacob C. Albertson, mailing date May 10, 2012, 20 pages.

Notice of Allowance, U.S. Appl. No. 11/622,696, filed Jan. 12, 2007, In re Albertson, mailing date Jul. 12, 2013, 22 pages.

U.S. Appl. No. 13/543,476, filed Jul. 6, 2012, In Re Jacob E Albertson, International Business Machines Corporation, 68 pages.

PCT Report, PCT/EP2008/050117, mailing date Jun. 19, 2008, 10 pages.

USPTO Office Action, Dated Jun. 25, 2009, In Re Albertson (U.S. Appl. No. 11/470,421, filed Sep. 6, 2006), pp. 1-20.

Notice of Allowance, U.S. Appl. No. 11/622,676, filed Jan. 12, 2007, In Re Jacob C Albertson, International Business Machines Corporation, mailing date May 16, 2012, 34 pages.

Office Action, U.S. Appl. No. 11/622,696, filed Jan. 12, 2007, In Re Jacob C Albertson, mailing date Jun. 7, 2012, 78 pages.

Notice of Allowance, U.S. Appl. No. 11/622,679, filed Jan. 12, 2007, In Re Jacob C Albertson, International Business Machines Corporation, mailing date May 21, 2012, 15 pages.

U.S. Appl. No. 11/622,679, Albertson et al, filed Jan. 12, 2007, Non-Final Office Action, mailing date Jun. 13, 2011, 53 pages.

Alan Yuille, "Computer Vision Systems for the Blind and Visually Disabled", UCLA Dept. Statistics and Psychology, 4 pages, [online], [print accessed on Aug. 18, 2006]. Retrieved from the internet < www.stat.ucla.edu/~yuille/courses/FIAT_Stat19/fiat3.ppt>.

"What is Photosynth", Microsoft Live Labs, copyright Microsoft Corporation 2006, 1 page, [online], [print accessed on Mar. 18, 2006]. Retrieved from the internet <http://labs.live.com/photosynth/whatis/>.

[Online], [print accessed on Aug. 18, 2006]. Retrieved from the Internet <http://www.sandia.gov/RADAR/whatis.html>.

"Accelerometer", copyright Wikipedia, 3 pages, [online], [print accessed on Oct. 31, 2006], [last modified on Oct. 24, 2006]. Retrieved from the Internet <http://en.wikipedia.org/wiki/Accelerometer>.

Eric Lipton, "Faces, Too are Searched as U.S. Airports Try to Spot Terrorists", 1 page, The New York Times, Aug. 17, 2006.

Notice of Allowance, U.S. Appl. No. 11/622,676, filed Jan. 12, 2007, Albertson et al, mailing date Dec. 30, 2011, 74 pages.

Office Action, U.S. Appl. No. 11/622,676, filed Jan. 12, 2007, Albertson et al, mailing date Jun. 17, 2011, 63 pages.

USPTO Office Action, Dated Mar. 22, 2010, In Re Albertson (U.S. Appl. No. 11/622,690, filed Dec. 12, 2007), 30 pages.

USPTO Office Action, Dated Mar. 30, 2010,In Re Albertson (U.S. Appl. No. 11/622,685, filed Dec. 12, 2007, 28 pages.

U.S. Appl. No. 11/622,687, Albertson et al, filed Jan. 12, 2007, Notice of Allowance, mailing date Feb. 23, 2011, 14 pages.

"Method for Access Control Via Gesural Verification", IBM Technical Disclosure Bulletin, IBM Corp, New York, US, vol. 36, No. 9B, Sep. 1, 1993, pp. 487-488, 2 pages.

(56) References Cited

OTHER PUBLICATIONS

Black, MJ et al, "Recognizing Temporal Trajectories Using the Condensation Algorithm", Automatic Face and Gesture Recognition, 1998, Proceedings from the Third IEEE International Conference on Nara, Japan, Apr. 1998, Los Alamitos CA, USA, IEEE Comuting Society, pp. 16-21, 6 pages.
USPTO Notice of Allowance, dated Apr. 23, 2010, In Re Albertson (U.S. Appl. No. 11/622,693, filed Jan. 12, 2007), pp. 1-14.
USPTO Notice of Allowance, Dated May 3, 2010, In Re Albertson (U.S. Appl. No. 11/622,684, filed Jan. 12, 2007), p. 1-37.
Albertson et al, Notice of Allowance, U.S. Appl. No. 11/622,685, filed Jan. 12, 2007, dated Jul. 2, 2010, 13 pages.
Albertson et al, Office Action, U.S. Appl. No. 11/622,687, filed Jan. 12, 2007, dated Aug. 16, 2010, 32 pages.
Doherty, G.J., "Formal Verification in the Design of Gestural Interaction", Electronic Notes in Theoretical Computer Science, vol. 43, pp. 75-96 (2001).
Albertson et al, USPTO Notice of Allowance, U.S. Appl. No. 11/622,690, filed Jan. 12, 2007, mailing date Sep. 20, 2010, 27 pages.
USPTO Notice of Allowance, Dated Dec. 14, 2009, In Re Albertson (U.S. Appl. No. 11/470,421, filed Sep. 6, 2006), pp. 1-13.
USPTO Office Action, Dated Jan. 15, 2010, In Re Albertson (U.S. Appl. No. 11/622,684, filed Jan. 12, 2007), p. 1-24.
USPTO Office Action, Dated Jan. 14, 2010, In Re Albertson (U.S. Appl. No. 11/622,693, filed Jan. 12, 2007), pp. 1-23.
PCT opinion, dated Jul. 4, 2008, PCT/EP2008/050079, 11 pages.
PCT opinion, dated May 8, 2008, PCT/EP2008/050170, 13 pages.

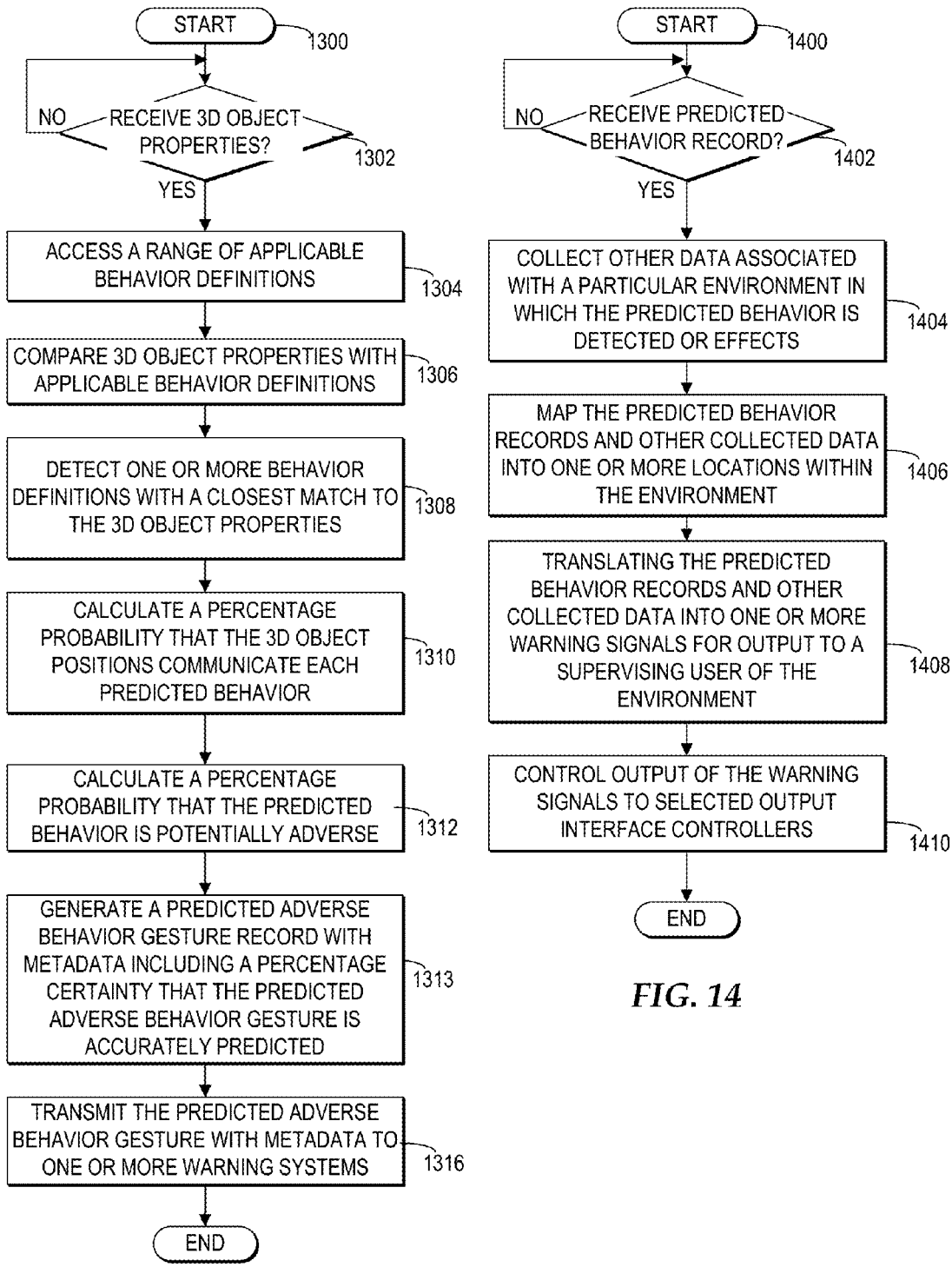

WARNING A USER ABOUT ADVERSE BEHAVIORS OF OTHERS WITHIN AN ENVIRONMENT BASED ON A 3D CAPTURED IMAGE STREAM

CROSS-REFERENCE TO RELATED APPLICATIONS

This application is a continuation of commonly assigned U.S. patent application Ser. No. 13/370,004, filed Feb. 9, 2012, which is a continuation of U.S. Pat. No. 8,269,834, issued Sep. 18, 2012, which are hereby incorporated herein by reference.

TECHNICAL FIELD

The present invention relates in general to improved behavior identification. In particular, the present invention relates to detecting, from a three-dimensional image stream captured by one or more image capture devices, behaviors of others and informing a user of adverse behaviors of others.

DESCRIPTION OF THE RELATED ART

During traffic stops, interrogations, security checkpoints, store security, and other routine law enforcement activity, law enforcement agents are limited in the moment to their own perceptions of body language and behaviors. While it is common for law enforcement personnel to video tape activity for later use in analyzing a particular incident, law enforcement agents may misinterpret body language and behaviors while in the moment. In one example, a law enforcement agent may assess different issues at the same time and may miss behaviors indicative of a person carrying a concealed weapon.

In addition to law enforcement agents, other types of jobs and roles require one or more persons to monitor and supervise an environment in which other persons or animals interact, where these supervising persons are also limited in the moment to their own perceptions of the body language and other behaviors of the persons or animals being monitored.

Therefore, in view of the foregoing, there is a need for a method, system, and program for monitoring an environment in which adverse behavior may occur, contemporaneously recognizing behaviors of people or animals within the environment, determining which behaviors are representative of adverse behavior, and communicating the potentially adverse behavior to a supervising user, such as law enforcement personnel, while the supervising user is still monitoring the environment.

SUMMARY OF THE INVENTION

Therefore, one embodiment of the invention provides behavior identification from a three-dimensional captured image for detecting, from a three-dimensional image stream captured by one or more image capture devices, behaviors of others and informing a supervising user of adverse behaviors of others.

In one embodiment, a system comprises one or more tactile feedback output devices operative to receive one or more warning signals for controlling one or more types of tactile output by the one or more tactile feedback output devices, the one or more warning signals representing that a predicted behavior of a monitored user represents a particular behavior that is potentially adverse and a percentage probability that the predicted behavior is adverse, the monitored user detected within a particular environment monitored by a supervising user, the one or more tactile feedback output devices worn by the supervising user. The system comprises the one or more tactile feedback output devices operative to control the one or more types of tactile outputs of the one or more tactile feedback output devices that are detectable by the supervising user wearing the one or more tactile feedback output devices according to the one or more warning signals to specifically alert the supervising user that the predicted behavior of the monitored user represents the particular behavior that is potentially adverse and the percentage probability that the predicted behavior is adverse.

In another embodiment, a method is directed to receiving, by one or more tactile feedback output devices, one or more warning signals for controlling one or more types of tactile output by the one or more tactile feedback output devices, the one or more warning signals representing that a predicted behavior of a monitored user represents a particular behavior that is potentially adverse and a percentage probability that the predicted behavior is adverse, the monitored user detected within a particular environment monitored by a supervising user, the one or more tactile feedback output devices worn by the supervising user. The method is directed to controlling, by the one or more tactile feedback output devices, the one or more types of tactile outputs of the one or more tactile feedback output devices that are detectable by the supervising user wearing the one or more tactile feedback output devices according to the one or more warning signals to specifically alert the supervising user that the predicted behavior of the monitored user represents the particular behavior that is potentially adverse and the percentage probability that the predicted behavior is adverse.

In another embodiment, a computer program product comprises one or more computer-readable storage devices and program instructions, stored on at least one of the one or more storage devices. The stored program instructions comprise program instructions to receive, by one or more tactile feedback output devices, one or more warning signals for controlling one or more types of tactile output by the one or more tactile feedback output devices, the one or more warning signals representing that a predicted behavior of a monitored user represents a particular behavior that is potentially adverse and a percentage probability that the predicted behavior is adverse, the monitored user detected within a particular environment monitored by a supervising user, the one or more tactile feedback output devices worn by the supervising user. The stored program instructions comprise program instructions to control, by one or more tactile feedback output devices, the one or more types of tactile outputs of the one or more tactile feedback output devices that are detectable by the supervising user wearing the one or more tactile feedback output devices according to the one or more warning signals to specifically alert the supervising user that the predicted behavior of the monitored user represents the particular behavior that is potentially adverse and the percentage probability that the predicted behavior is adverse.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 13 is a high level logic flowchart illustrating a process and program for behavior prediction from tracked 3D object properties; and FIG. 14 is a high level logic flowchart depicting. a process and program for applying a predicted behavior record in a behavior-enabled navigation system.

DETAILED DESCRIPTION OF THE PREFERRED EMBODIMENT

Figure 1:
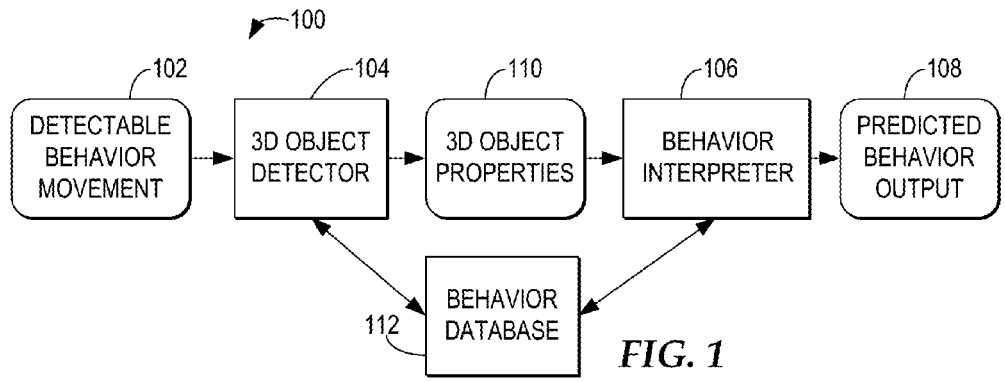
FIG. 1 is a block diagram illustrating a flow of information in a behavior processing method, system, and program.

With reference now to FIG. 1, a block diagram illustrates a flow of information in a behavior processing method, system, and program. It will be understood that FIG. 1 provides one embodiment of information flow for capturing image streams within an environment monitored by a supervising user and processing those image streams to predict behaviors of monitored users within the environment and to predict whether the behaviors are adverse behaviors, however, other information flows may be implemented to process captured data and predict types of behaviors and whether the behaviors are adverse.

It is important to note that as used throughout, the term "behavior" may include user actions typically labeled as behavior or body language, such as gesturing and facial expressions, and may also include any detectable body movements, detectable body posture, detectable eye movements, changes in skin surface characteristics such as color, temperature, tone, and level of perspiration, changes in muscle contraction, and other types of non-verbal communication. The term "adverse behavior", as used throughout, may include any behavior, but is used throughout with reference to behavior predicted as potentially suspicious, irregular, impaired, dangerous, or otherwise adverse in some way.

In addition, it is important to note that as used throughout, the term "supervising user" or "supervisor" may refer to any person or system that monitors or supervises a particular environment. A supervising user may be physically located within the particular environment or may monitor the particular environment from an external location. Behaviors of one or more monitored users monitored within the particular environment may be within or outside the line of sight of a supervising user. Examples of a supervising user or supervisor may include, but are not limited to, law enforcement personnel, security personnel, psychologists, store keepers, and teachers. Further, the behaviors of a supervising user may be monitored and reported to a manager of the supervising user, wherein the supervising user is then considered a monitored user. The term "monitored user", as used throughout, may include any persons or animals within a monitored environment.

In the example, a behavior processing system 100 includes a three-dimensional (3D) object detector 104. 3D object detector 104 represents multiple systems for capturing images and other data about moving and stationary objects, streamlining the captured data, tracking particular objects within the captured movement, streaming the properties of the particular objects, and combining the streamed properties into a three-dimensional representation of the 3D characteristics of the captured objects, as illustrated by 3D object properties 110. 3D object properties 110 may include, but are not limited to, positions, color, size, and orientation, representative of movement by monitored users, movement by supervising users, objects within an environment, and the background identifying attributes of an environment, for example.

In the example, 3D object detector 104 captures images within a focus area, represented as detectable behavior movement 102. In addition, 3D object detector 104 may detect other types of data within a focus area. In particular, 3D object detector 104 detects detectable behavior movement 102 through multiple types of image and data detection including, but not limited to, capturing video images, detecting body part movement, detecting skin texture, detecting eye movement, detecting skin surface characteristics, and capturing thermal images. For supporting multiple types of image and data detection, 3D object detector 104 may include multiple types of image capture devices, including one or more video cameras arranged for stereoscope video image capture, and other types of sensors for capturing at least one other characteristic of one or more objects, such as thermal body imaging sensors, skin texture sensors, laser sensing devices, sound navigation and ranging (SONAR) devices, or synthetic laser or sonar systems. In particular, a sensor may be implemented using a separate sensor unit or may be implemented through a logic unit that operates on a captured image stream. For example, a logic unit may process the captured image stream to detect facial skin textures distinguishable from non-skin textures, such as a smooth wall or textured foliage, within a focus area.

Portions of detectable behavior movement 102 may include images and other data representative of actual behaviors and other portions of detectable behavior movement 102 may include images and data not representative of behaviors. In addition, detectable behavior movement 102 may include one or more of moving and stationary monitored users, moving and stationary supervising users, and other objects.

3D object detector 104 translates detectable behavior movement 102 into a stream of 3D properties of detected objects and passes the stream of 3D object properties 110 to behavior interpreter 106. Behavior interpreter 106 maps the streamed 3D object properties 110 into one or more behaviors for each monitored user and estimates, for each predicted behavior of a monitored user, the probability that the actual behavior in detectable behavior movement 102 is correctly predicted by behavior interpreter 106. In addition, behavior interpreter 106 predicts whether a particular predicted behavior is also potentially adverse behavior. Further, behavior interpreter 106 may predict behaviors by supervising users from 3D object properties 110.

Behavior interpreter 106 outputs each predicted behavior, percentage probability, and whether the predicted behavior is potentially adverse as predicted behavior output 108. Behavior interpreter 106 may pass predicted behavior output 108 to one or more behavior-enabled applications at one or more systems.

In particular, in processing detectable behavior movement 102 and generating predicted behavior output 108, 3D object detector 104 and behavior interpreter 106 may access a behavior database 112 of previously accumulated and stored behavior definitions to better track and detect, within 3D object properties 110, those monitored objects representative of behaviors, to better recognize monitored users separate from other objects within detectable behavior movement 102, and to better track, recognize, and predict potentially adverse behaviors from 3D object properties 110.

In addition, in processing behavior movement 102 and generating predicted behavior output 108, 3D object detector 104 and behavior interpreter 106 may access behavior database 112 with behavior definitions specified for the type of behavior-enabled application to which predicted behavior output 108 will be output. For example, in the present embodiment, predicted behavior output 108 may be output to a warning system, for the warning system to convert into warning signals, such that behavior interpreter 106 attempts to predict a type of behavior from a detected object movement that more closely resembles a type of behavior that has been determined to be more likely representative of adverse behavior if sent to the particular warning systems.

In one example, law enforcement personnel may monitor many different types of environments. A law enforcement officer monitoring an environment during a traffic stop may benefit from warnings of adverse behaviors associated with potentially concealed weapons more than a law enforcement officer monitoring an environment during an interrogation where a monitored user would not have a concealed weapon. In another example, law enforcement personnel monitoring a security checkpoint may benefit from warnings of suspicious behavior before a monitored user actually reaches the security checkpoint, such as profuse sweating, signs of anxiety, irregular clothing drape or irregular clothing bulk potentially indicative of a concealed weapon or other behaviors which at a security checkpoint may indicate a concealed adverse purpose for passing a security checkpoint.

Further, in processing behavior movement 102 and generating predicted behavior output 108, 3D object detector 104 and behavior interpreter 106 attempt to identify objects representative of monitored user behaviors and predict the type of behavior in view of the overall interaction in which the behavior is made. Thus, 3D object detector 104 and behavior interpreter 106 attempt to determine not just a behavior, but a level of emphasis included in a behavior that would effect the meaning of the behavior, a background of a monitored user making a behavior that would effect the meaning of the behavior, the environment in which the monitored user makes the behavior that would effect the meaning of the behavior, combinations of behaviors made together that effect the meaning of each behavior and other detectable factors that effect the meaning of a behavior. Thus, behavior database 112 includes behaviors definitions corresponding to different types of people, environments, and other factors that may affect the meaning of a behavior. In addition, behavior database 112 includes behavior definitions adjusted according to a corresponding facial expression or other corresponding behavior. Further, behavior database 112 may be trained to more accurately identify objects representing particular people, animals, places, or things that a particular supervising user most commonly interacts with, and to more accurately identify objects moving in behaviors that represent adverse behaviors to a particular supervisor, and therefore provide more specified behavior definitions.

In addition, in processing behavior movement 102, multiple separate systems of image capture devices and other sensors may each capture image and data about separate or overlapping focus areas from different angles. The separate systems of image capture devices and other sensors may be communicatively connected via a wireless or wired connection and may share captured images and data with one another, between 3D behavior detectors or between behavior interpreters, such that with the combination of data, behavior interpreter 106 may interpreter behaviors with greater accuracy.

Figure 2:
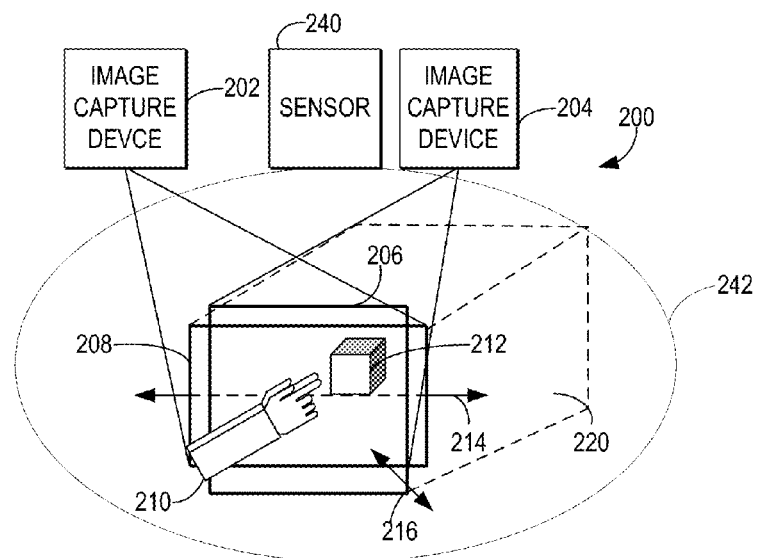
FIG. 2 is an illustrative block diagram depicting an example of an environment in which a 3D object detector captures and generates the 3D object properties representative of captured behavior movement.
Figure 10:
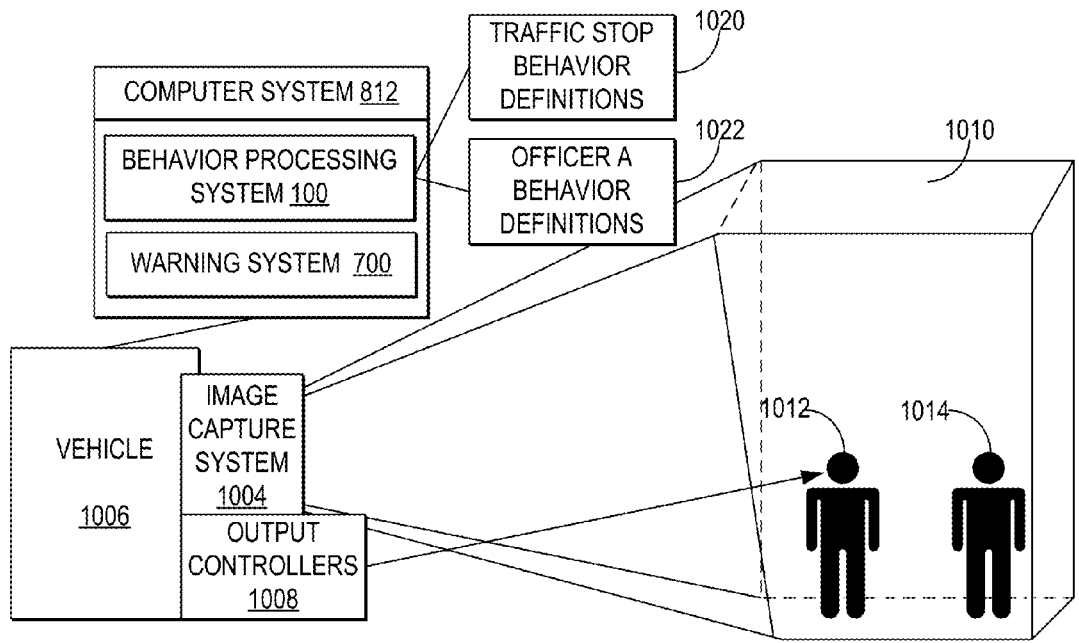
FIG. 10 is an illustrative diagram depicting one example of an environment in which the potentially adverse behaviors of a monitored user are detected and communicated by a warning system to a supervising user.

Referring now to FIG. 2, an illustrative diagram depicts an example of an environment in which a 3D object detector captures and generates the 3D object properties representative of captured behavior movement. It will be understood that detectable movement environment 200 is one example of an environment in which 3D object detector 104 detects images and data representative of detectable behavior movement 102, as described with reference to behavior processing system 100 in FIG. 1. Other environments may be implemented in which behavior movement is detected and processed. For example, FIG. 10 illustrates an environment in which a monitored user and supervising user are both detected. In another embodiment, the behavior movements of a supervising user are detected and monitored.

In the example, detectable movement environment 200 includes a stereoscopic image device comprising an image capture device 202 and an image capture device 204, each positioned to detect movement of one or more objects, including monitored users, within a combined 3D focus area 220. In the depicted embodiment, image capture device 202 and image capture device 204 may each be positioned on one stationary axis or separate stationary axis, such that the area represented by 3D focus area 220 remains constantly focused upon. In addition, in the depicted embodiment, image capture device 202 and image capture device 204 and any other sensors may be positioned in parallel, at tangents, or at any other angles to control the span of and capture images within 3D focus area 220.

In another embodiment, image capture device 202 and image capture device 204 may each be positioned on a position adjustable axis or the actual focus point of image capture device 202 and image capture device 204 may be adjustable, such that the area represented by 3D focus area 220 may be repositioned. In one example, each of image capture device 202 and image capture device 204 may be coupled with one or more thermal imaging devices that detect thermal imaging based movement within a broad area and directs the repositioning of the focus area of each of image capture device 202 and image capture device 204 to track the thermal movement within the focus area of each camera.

Further, in the present embodiment, image capture device 202 and image capture device 204 may be affixed to an apparatus that is carried by or worn by a monitored user or a supervising user. For example, image capture device 202 and image capture device 204 may be affixed to a pair of glasses or other headwear for a monitored user or a supervising user, such that 3D focus area 220 changes as the user moves. In another example, image capture device 202 and image capture device 204 may be affixed to a moving machine, such as a vehicle, such that 3D focus area 220 changes as the vehicle moves.

Although not depicted, in another embodiment, only a single video camera, such as image capture device 202, may be implemented as a stereoscopic image device. The single video camera is placed on a track or other adjustable axis and a controller adjusts the position of the single video camera along the track, wherein the single video camera then captures a stream of video images within a focus area at different positioned points along the track and 3D behavior detector 104 combines the stream of images into a 3D object property stream of the properties of detectable objects. In one example, the 3D object property stream can be generated from comparing the changes in luminance and shadowing across the frames as the camera changes in position. Alternatively, a stereoscopic image device may be implemented using a single fixed camera coupled with a sensor that detects depth. In addition, alternatively, a single camera enabled to process images and detect depth from a fixed position may function as a stereoscopic image device. For example, the single camera may process images and detect depth from detecting the movement of a light source and comparing changes in luminance and shadowing across the captured image frames. In particular, the single camera system may first map a model of a monitored user face, focusing on the eyes, mouth, and nose and then detect changes in luminance and shadowing across image frames to detect depth characteristics of the face. In other examples, a sensor may process a captured stream of video images to extract depth from other characteristics of the stream of images.

For purposes of example, 3D focus area 220 includes a first capture plane 206, captured by image capture device 202 and a second capture plane 208, captured by image capture device 204. First capture plane 206 detects movement within the plane illustrated by reference numeral 214 and second capture plane 208 detects movement within the plane illustrated by reference numeral 216. Thus, for example, image capture device 202 detects movement of an object side to side or up and down and image capture device 204 detects movement of an object forward and backward within 3D focus area 220. It is important to note that when the movement of an object is tracked at a fine granularity, even small adjustments in the body movement such as a raised eyebrow, a jaw thrust forward, or a slight gait, of a monitored user are tracked and can then be interpreted as indicative of adverse behavior that a supervising user should be warned of.

In the example, within 3D focus area 220, a hand 210 represents a moving object and a box 212 represents a stationary object. In the example, hand 210 is the portion of a person's hand within 3D focus area 220. A monitored user may make any number of movements, some representative of adverse behaviors, by moving hand 210.

As a person moves hand 210 within 3D focus area 220, each of image capture device 202 and image capture device 204 capture a video stream of the movement of hand 210 within capture plane 206 and capture plane 208. From the video streams, 3D object detector 104 detects hand 210 as a moving object within 3D focus area 220 and generates a 3D property stream, representative of 3D object properties 110, of hand 210 over a period of time.

In addition, a person may move hand 210 in relation to box 212 or another object. For example, a user may point or make another type of behavior directed to box 212. As the person moves hand 210 within 3D focus area 220, the video streams captured by image capture device 202 and image capture device 204 include the movement of hand 210 and box 212. From the video streams, 3D object detector 104 detects hand 210 as a moving object and box 212 as a stationary object within 3D focus area 220 and generates 3D object property streams indicating the 3D properties of box 212 and the 3D properties of hand 210 in relation to box 212 over a period of time.

It is important to note that by capturing different planes of movement within 3D focus area 220 using multiple cameras, more points of movement are captured than would occur with a typical stationary single camera. By capturing more points of movement from more than one angle, 3D object detector 104 can more accurately detect and define a 3D representation of stationary objects and moving objects, including behaviors, within 3D focus area 220. In addition, the more accurately that 3D object detector 104 defines a 3D representation of a moving object, the more accurately behavior interpreter 106 can predict a behavior from the 3D model. For example, a behavior could consist of a user making a motion directly towards or away from one of video camera 202 and video camera 204 which would not be able to be captured in a two dimensional frame; 3D behavior detector 104 detects and defines a 3D representation of the behavior as a moving object and behavior interpreter 106 predicts the behavior made by the movement towards or away from a video camera from the 3D model of the movement.

For example, a monitored user may change the position of hand 210 to a clinched fist. The tightness of a fist and the position of a thumb in the fist can effect whether the behavior of clinching a fist should be interpreted as adverse behavior. By capturing, mapping, and tracking a 3D image of a clinched fist at a fine granularity, the tightness of a fist and the position of a thumb in the fist are detected, such that behavior interpreter 106 may more accurately map to and predict that a detected behavior is a clinched fist and whether a particular clinched fist is representative of adverse behavior. For example, if the position of the thumb is not directly captured from the 3D images, the 3D positioning of other fingers is still detected and behavior interpreter 106 determines from the 3D positioning of the fingers whether fingers are wrapped around the thumb or whether the thumb is holding the fingers down from the outside.

In addition, it is important to note that while FIG. 2 illustrates a gesturing hand 210 and a stationary box 212, in alternate embodiments, 3D focus area 220 may include multiple separate monitored users and supervising users, such that image capture device 202 and image capture device 204 capture images of the behavior of multiple people, and 3D object detector 104 detects each behavior by each person as a separate object. In particular, 3D object detector 104 may detect, from the captured video images from image capture device 202 and image capture device 204, behaviors with more motion, such as behaviors made with hands, and behaviors made with less motion, such as facial expressions, to accurately generate 3D object properties of a person's non-verbal communication and interaction with others.

In the example, in addition to capturing images within focus area 220, within detectable movement environment 200, other sensors may detect information relevant to an environment, but outside of focus area 220. For example, sensor 240 may detect information within a sensor area 242. Sensor area 242 may overlap, be incorporated within, incorporate, or be separate from focus area 220. 3D object detector 104 combines the sensed information with captured images to more accurately generate 3D object properties 110 and to provide additional information about an environment to a warning system.

In one example, sensor 240 may perform facial recognition or other identification recognition from the captured image streams. In one example, sensor 240 may access a database of facial mappings for monitored users and supervising users and identify a particular user facial mapping matching a particular facial mapping from the database. In another example, sensor 240 may analyze the captured image stream for text that may identify a monitored user. For example, sensor 240 may detect a badge number the captured image stream of a badge worn by a monitored user or supervising user. By sensor 240 detecting a user identity, object detector 104 may more accurately generate 3D object properties and movement interpreter 106 may more accurately predict types of user behavior from definitions specified for the identified user in definition database 112.

Additionally, in another example, sensor 240 may supplement user recognition by detecting information broadcast from RFID chips placed on items within sensor area 242, wherein the RFID of an object broadcasts the object type, the object location, and any warning conditions associated with the object. By combining sensed information about the location of a particular object with captured images from which the image is identified, object detector 104 may more accurately generate 3D object properties 110 and behavior interpreter 106 may more accurately predict the types of 3D objects and the potentially adverse behavior detected within 3D object properties 110. In addition, by sensor 240 accessing location information, behavior interpreter 106 may include location identifying data with a behavior record that enables a behavior-enabled warning system to map behaviors to particular monitored users and within particular monitored environments.

In another example, sensor 240 may track the relative location of a tracked object within sensor area 242. Although not depicted, sensor area 242 may track a moving object, including a monitored user or supervising user, from a first focus area 220 to a second focus area within sensor area 242. By tracking movement across multiple focus areas, sensor 240 provides additional tracking information of a location of a monitored user or supervising user so that data gathered in different focus areas can be shared when generating 3D object properties 110. Additionally, sensor area 242 may represent a particular security area, where if motion is detected within sensor area 242, sensor 240 triggers adjustment of focus area 220 to capture motion causing entity. Moreover, sensor 240 may detect a changing GPS location of sensor area 242 such that maps or other information associated with a particular GPS location can be accessed and used in generating 3D object properties 110, determining whether behavior is potentially adverse, and in warning supervisors within the GPS mapped area of potentially adverse behavior detected within the mapped area.

In yet another example, sensor 240 may detect additional information about the depth, surface area, color temperature or other characteristic of an object to more accurately predict whether the object is representative of a particular behavior and whether that behavior is potentially adverse. In particular, by detecting additional information about the depth, surface area, or other characteristic of an object, data collected by sensor 240 is combined with images captured by image capture device 202 and image capture device 204 to generate additional detail and granularity in a detected 3D object.

Figure 3:
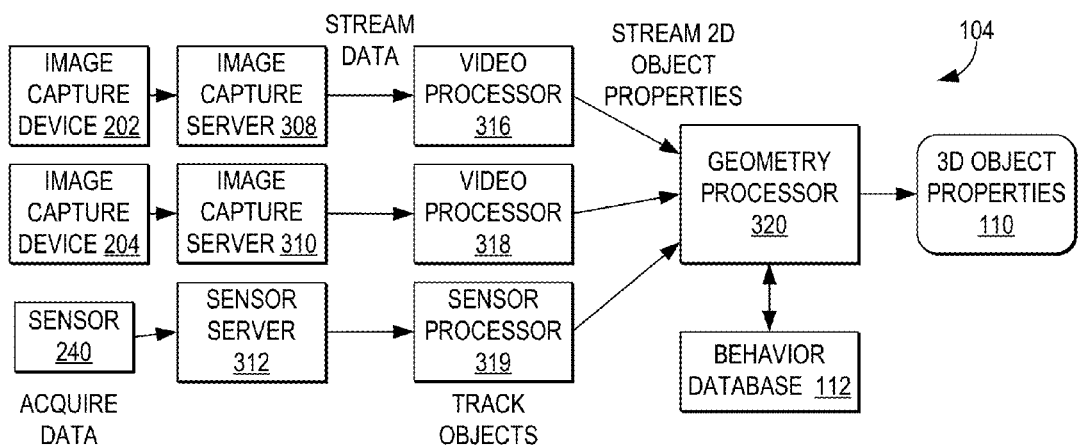
FIG. 3 is a block diagram illustrating one embodiment of a 3D object detector system for generating 3D object properties for enabling a behavior interpreter to interpret, from 3D object properties, behaviors of monitored users and whether these behavior are potentially adverse.

With reference now to FIG. 3, a block diagram illustrates one embodiment of a 3D object detector system for generating 3D object properties for enabling a behavior interpreter to interpret, from 3D object properties, behaviors of monitored users and whether these behavior are potentially adverse. It is important to note that the multiple components depicted within 3D object detector 104 may be incorporated within a single system or distributed via a network, other communication medium, or other transport medium across multiple systems. In addition, it is important to note that additional or alternate components from those illustrated may be implemented in 3D object detector 104 for capturing images and data and generating a stream of 3D object positions 110.

Initially, multiple image capture devices, such as image capture device 202, image capture device 204 and sensor 240, represent a stereoscopic image capture device for acquiring the data representative of detectable movement 102 within a 3D focus area and sensor area, such as 3D focus area 220 and sensor area 242. As previously described, image capture device 202 and image capture device 204 may represent video cameras for capturing video images. In addition, image capture device 202 and image capture device 204 may represent a camera or other still image capture device. In addition, image capture device 202 and image capture device 204 may represent other types of devices capable of capturing data representative of detectable behavior movement 102. Image capture device 202 and image capture device 204 may be implemented using the same type of image capture system or different types of image capture systems. In addition, the scope, size, and location of the capture area and plane captured by each of image capture device 202 and image capture device 204 may vary.

Sensor 240 may represent one or more different types of sensors, including, but not limited to, RFID readers, thermal body imaging sensors, skin texture sensors, laser sensing devices, sound navigation and ranging (SONAR) devices, or synthetic laser or sonar systems. In addition, sensor 240 may include sensors that detect a particular type of body part, a particular type of body movement, or textures indicative of skin separate from non-skin based textures. Sensor 240 may gather independent data about an object or may process the images captured by image capture device 202 and image capture device 204.

In particular, sensor 240 detects information about objects in a particular sensor area that enhances the ability of 3D object detector 104 to create 3D object properties 110. For example, by implementing sensor 240 through a SONAR device, sensor 240 collects additional information about the depth of an object and the distance from the SONAR device to the object, where the depth measurement is used by one or more of video processor 316, video processor 308, or a geometry processor 320 to generate 3D object positions 110. If sensor 240 is attached to a moving object, a synthetic SONAR device may be implemented.

Each of image capture device 202, image capture device 204, and sensor 240 transmit captured images and data to one or more computing systems enabled to initially receive and buffer the captured images and data. In the example, image capture device 202 transmits captured images to image capture server 308, image capture device 204 transmits captured images to image capture server 310, and sensor 240 transmits captured data to sensor server 312. Image capture server 308, image capture server 310, and sensor server 312 may be implemented within one or more server systems.

Each of image capture server 308, image capture server 310, and sensor server 312 streams the buffered images and data from image capture device 202, image capture device 204, and sensor device 240 to one or more processors. In the example, image capture server 308 streams images to a video processor 316, image capture server 310 streams images to a video processor 318, and sensor server 312 streams the sensed data to sensor processor 319. It is important to note that video processor 316, video processor 318, and sensor processor 319 may be implemented within one or more processors in one or more computer systems.

In one example, image capture server 308 and image capture server 310 each stream images to video processor 316 and video processor 318, respectively, where the images are streamed in frames. Each frame may include, but is not limited to, a camera identifier (ID) of the image capture device, a frame number, a time stamp and a pixel count.

Video processor 316, video processor 318, and sensor processor 319 are programmed to detect and track objects within image frames. In particular, because video processor 316, video processor 318, and sensor processor 319 receive streams of complex data and process the data to identify three-dimensional objects, including objects representing monitored users and supervising users, and characteristics of the three-dimensional objects, video processor 316, video processor 318, and sensor processor 319 may implement the Cell Broadband Engine (Cell BE) architecture (Cell Broadband Engine is a registered trademark of Sony Computer Entertainment, Inc.). The Cell BE architecture refers to a processor architecture which includes a base processor element, such as a Power Architecture-based control processor (PPE), connected to multiple additional processor elements also referred to as Synergetic Processing Elements (SPEs) and implementing a set of DMA commands for efficient communications between processor elements. In particular, SPEs may be designed to handle certain types of processing tasks more efficiently than others. For example, SPEs may be designed to more efficiently handle processing video streams to identify and map the points of moving objects within a stream of frames. In addition, video processor 316, video processor 318, and sensor processor 319 may implement other types of processor architecture that enables efficient processing of video images to identify, in three-dimensions, moving and stationary objects within video images from which behavior of monitored users, and the potential the behavior is adverse, can be predicted.

In the example, video processor 316, video processor 318, and sensor processor 319 each create and stream the properties, including positions, color, size, shape, and orientation, of the detected objects to a geometry processor 320. In one example, each processed frame streamed to geometry processor 320 may include, but is not limited to, a camera ID, a frame number, a time stamp, and combinations of two or more of X axis coordinates (x_loc), Y axis coordinates (y_loc), and Z axis coordinates (z_loc). It is important to note that x_loc, y_loc, and z_loc may each include multiple sets of points and other data that identify all the properties of an object. If multiple objects are detected and tracked within a single frame, the X axis coordinates and Y axis coordinates for each object may be included in a single streamed object property record or in multiple separate streamed object property records. In addition, a streamed property frame, such as the frame from sensor processor 319 for a SONAR detected position, may include Z axis location coordinates, listed as z_loc, for example.

Geometry processor 320 receives the 2D streamed object properties from video processor 316 and video processor 318 and the other object data from sensor processor 319. Geometry processor 320 matches up the streamed 2D object properties and other data and constructs 3D object properties 110 from the streamed 2D object properties and other data. In particular, geometry processor 320 constructs 3D object properties 110 that include the depth of an object. In one example, each 3D object property record constructed by geometry processor 320 may include a time stamp, an object or user movement label, X axis coordinates (x_loc), Y axis coordinates (y_loc), and Z axis coordinates (z_loc), and additional information collected from sensors. For example, additional information collected from sensors may include a location identifier received from an RFID or GPS detected location coordinates.

At any of video processor 316, video processor 318, sensor processor 319, and geometry processor 320 property records may include at least one identifier to enable persistence in tracking the object. For example, the identifier may include a unique identifier for the object itself and an identifier of a class or type of object, including an object identified as user movement.

In particular, by video processor 316, video processor 318, and sensor processor 319 identifying and classifying object properties, each of the processors may access behavior database 112 for accessing previously processed inputs and behavior mappings to more accurately identify and classify 2D object properties to detect and match the streamed 2D object properties to an object. In addition, geometry processor 320 may more accurately construct 3D properties of objects based on the streamed 2D object properties, based on previously matched and constructed 3D properties of objects accessed from behavior database 112. Further, object database 122 may store the streamed 2D object properties and 3D object properties for future reference.

In addition, by video processor 316, video processor 318, and sensor processor 319 identifying and classifying object properties and by geometry processor constructing 3D object properties 110, each of the processors may identify detected objects, including behaviors of monitored users. For example, video processor 316, video processors 318, sensor processor 319, and geometry processor 320 may access behavior database 112, which includes specifications for use in mapping facial expressions and other body movements, performing facial and other body movement recognition, and performing additional processing to identify an object representing a behavior. In addition, video processor 316, video processors 318, sensor processor 319, and geometry processor 320 may access behavior database 112, which includes specifications for different types of environments for use in identifying a particular environment in which a user is located based on detected objects and background. Further, in constructing 3D object properties 110, video processor 316, video processors 318, sensor processor 319, and geometry processor 320 may identify multiple detected objects in the environment and therefore identify multiple behaviors of a single monitored user or one or more interactions between multiple users. By monitoring and identifying interactions between objects detected in the environment in which the object is located, more accurate prediction of a behavior in the context in which the behavior is made may be performed.

Figure 4:
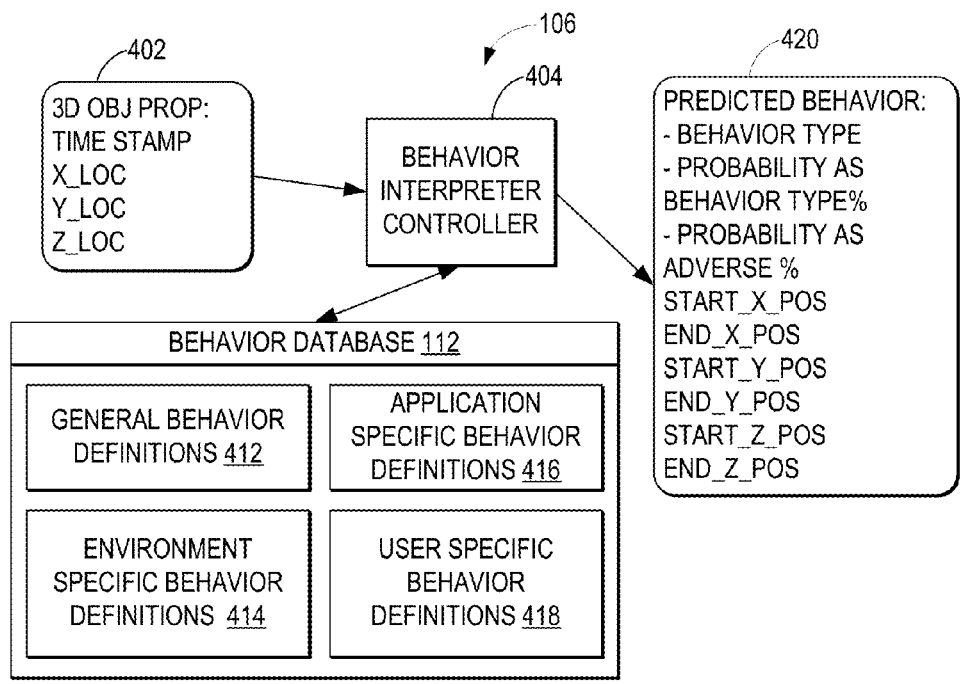
FIG. 4 is a block diagram depicting one embodiment of a behavior interpreter system.

Referring now to FIG. 4, a block diagram illustrates one embodiment of a behavior interpreter system. It is important to note that the multiple components depicted within behavior interpreter 106 may be incorporated within a single system or distributed via a network across multiple systems. In the example, a 3D properties record 402 includes "time stamp", "x_loc", "y_loc", and "z_loc" data elements. It will be understood that 3D properties record 402 may include additional or alternate data elements as determined by geometry processor 320 of FIG. 3. For example, 3D properties record 402 may include additional information identifying a particular or relative location of a user within a sensor area and not just within the focus area, colors, and other data collected by image capture devices and sensors and processed within 3D object detector 104.

Behavior interpreter 106 includes a behavior interpreter controller 404, where behavior interpreter controller 404 may include one or more processors programmed to perform behavior interpretation. For example, behavior interpreter controller 404 may include a processor with the CellBE architecture, programmed to efficiently process 3D object properties data streams, predict behaviors of monitored users from the 3D object properties streams, and predict whether the behaviors are potentially adverse. In addition, behavior interpreter controller 404 may include processors upon which software runs, where the software directs processing of 3D object properties streams, predicts behaviors of monitored users from the 3D object properties streams, and predicts whether the behaviors are potentially adverse.

In processing 3D object properties streams, predicting behaviors, and predicting potentially adverse behaviors, behavior interpreter controller 404 maps 3D object properties to one or more behavior actions with a percentage probability that the streamed 3D object properties represent the mapped behavior actions and with a percentage probability that the predicted behavior represents an adverse behavior. In particular, behavior interpreter controller 404 accesses one or more behavior definitions for one or more behaviors and determines whether the 3D object properties match one or more characteristics of one or more behaviors as defined in one or more of the behavior definitions. Behavior definitions may include mapped 3D models of one or more types of behaviors. In addition, behavior definitions may define the parameters of identifying characteristics of a behavior including, but not limited to, body part detected, type of movement, surface characteristics, shape, speed of movement, frequency, span of movement, depth of movement, temperature, and color.

In addition, behavior definitions are specified to enable behavior interpreter controller 404 to determine whether characteristics of a behavior indicate that the behavior is potentially adverse. For example, once behavior interpreter controller 404 determines that an object stream represents a behavior of "forming a fist" from one or more behavior definitions, behavior interpreter controller 404 compares additional characteristics of the fist, such as the tightness of the fist to characteristics defined in the behavior definition for tightness. For example a behavior definition may specify a range of tightness determined by the amount of curl of the fingers to the palm. Within the behavior definition, the tighter the fist, the more likely the behavior is adverse. In another example, the behavior definition may also specify that the tightness of the fist and the position of the fist in relation to the monitored user's body, together, determine whether the behavior is potentially adverse.

In another example, once behavior interpreter controller 404 determines that an object stream represents a behavior of "dropping an object from a hand" from one or more behavior definitions, behavior interpreter controller 404 determines additional characteristics of the object dropped and the location the object was dropped and compares the characteristics and location of the object with additional factors defined in the behaviors definitions for potentially adverse dropped objects. A dropped piece of paper into a trash receptacle may not indicate potentially adverse behavior, however a dropped bag under a seat may indicate potentially adverse behavior.

In yet another example, once behavior interpreter controller 404 determines that an object stream represents a behavior of "object carried under clothing" from one or more behavior definitions, behavior interpreter controller 404 determines additional characteristics of the bulk of the object area and compares the bulk characteristics with additional factors defined in the behaviors definitions for potentially adverse carried objects.

It is important to note that in interpreting 3D object properties streams, behavior interpreter controller 404 performs an aggregate analysis of all the tracked objects in one or more 3D object properties streams identified for a particular focus area by one or more behavior processing systems. In one example, behavior interpreter controller 404 aggregates the 3D object property streams for a particular focus area and particular sensor area. In another example, behavior interpreter controller 404 may receive multiple 3D object properties streams from areas overlapping a focus area and sensor area, analyze the 3D object properties streams for similarities, location indicators, and orientation indicators, and construct the 3D object properties streams into a 3D aggregate representation of an area.

In one embodiment, behavior interpreter controller 404 may map the aggregate of the tracked objects directly into a single behavior definition. In another embodiment, behavior interpreter controller 404 maps multiple aggregated tracked objects into multiple behavior definitions. For example, a person may simultaneously communicate through facial behavior and a hand behavior, where in predicting the actual behaviors communicated through the tracked movement of the facial behavior and hand behavior, behavior interpreter controller 404 analyzes the 3D object properties of the facial behavior in correlation with the 3D object properties of the hand behavior and accesses behavior definitions to enable prediction of each of the behaviors and to enable prediction of whether the behaviors, in combination, represent potentially adverse behavior. Additionally, behavior interpreter controller 404 may aggregate the tracked objects representative of behavior by multiple monitored users within an environment. Behavior interpreter controller 404 then predicts whether the combination of behaviors by multiple monitored users is representative of potentially adverse behavior.

In the example, behavior interpreter controller 404 accesses behavior definitions from behavior database 112, which includes general behavior definitions 412, environment specific behavior definitions 414, application specific behavior definitions 416, and user specific behavior definitions 418. It will be understood that behavior database 112 may include additional or alternate types of behavior definitions. In addition, it is important to note that each of the groupings of behavior definitions illustrated in the example may reside in a single database or may be accessed from multiple database and data storage systems via a network.

General behavior definitions 412 include behavior definitions for common behaviors and factors for determining whether a general behavior is adverse. For example, general behavior definitions 412 may include behaviors definitions for common behaviors, such as a person pointing, a person waving, a person nodding "yes" or shaking one's head "no", or other types of common behaviors that are not generally associated with adverse behavior, but could represent adverse behavior depending on the context. For example, in identifying a person shaking one's head "no", additional factors such as the speed at which the person shakes and whether the person's eyebrows are raised are also detected and affect the levels of detection effect whether the person's head shake is potentially adverse behavior. In another example, general behavior definitions 412 may include behaviors that in general represent adverse behavior such as a person clinching one's teeth or a person with a jaw thrust forward.

Environment specific behavior definitions 414 include behavior definitions and factors for determining whether behavior is adverse that are specific to the context in which the behavior is being detected. Examples of contexts may include, but are not limited to, the current location of a monitored user, the time of day, the cultural meanings behind gestures and other behaviors within the context, the languages spoken within the context, and other factors that influence the context in which behavior could be interpreted. The current location of a monitored user may include the country or region in which the user is located and may include the actual physical environment, such as a traffic stop, an enclosed room, or a security checkpoint, for example. Behavior interpreter controller 404 may detect current context from accessing a GPS indicator of a monitored user or supervising user's location, from performing speech analysis of the monitored user's speech to detect variations in language and dialect, from detecting objects within the image data indicative of particular types of locations, or from receiving additional data from other systems monitoring the context in which a monitored user is monitored.

Application specific behavior definitions 416 include behavior definitions specific to the behavior-enabled application to which predicted behavior output 108 will be sent. For example, in the present embodiment, predicted behavior output 108 may be output to a behavior-enabled application that is a warning system incorporated within a navigation system that provides audio navigation and warning output to a headset worn by a police officer, wherein selected behavior definitions focus on the types of behaviors that would be relevant for navigation based warning systems. In another example, predicted behavior output 108 may be output to a behavior-enabled application that is a warning system incorporated within a surveillance system that provides highlighting, within video feed, of potentially adverse behavior from monitored the video feeds, wherein selected behavior definitions focus on behaviors warned of by surveillance based warning systems.

User specific behavior definitions 418 include behavior definitions specific to the monitored user or supervising user. In one example, behavior interpreter controller 404 accesses an identifier for a monitored user from the user presenting scannable identification, such as at a security check-point or traffic stop, the scanning of which provides an identifier for the monitored user to behavior interpreter controller 404. In another example, behavior interpreter controller 404 accesses an identifier for a monitored user from comparing an attribute of the user detected by 3D object detector 104, with a database of user attributes. For example, behavior interpreter controller 404 may perform facial or voice recognition if not already performed by 3D object detector 104. It will be understood that behavior interpreter controller 404 may perform other types of identity access and authentication of a monitored user or supervising user.

In addition, behavior database 112 may include behavior definitions and other factors specific to a supervising user or group of supervising users for a particular environment. In particular, behavior definitions and other factors may specify when the behavior of a supervising user is adverse. A supervising user's behavior may be considered adverse, for example, if the supervising user's behavior is outside the parameters of acceptable behavior or force in a particular environment or responsive to a particular adverse behavior of a monitored user. In addition, a supervising user's behavior may be considered adverse, for example, if the supervising user's behavior indicates the supervising user is impaired in some way, including behavior indicative of lack of experience.

Behavior database 112 may also include behavior definitions and other factors specified according to a level of experience of a monitored user or supervising user within a particular environment. For example, a supervising user's level of experience in monitoring a particular location may affect whether the supervising user's behavior is considered potentially adverse. In another example, a monitored user's level of experience or frequency of entering a particular location may affect whether the monitored user's behavior, or changes in behavior from an established norm, is considered potentially adverse.

Further, within the available behavior definitions, a behavior definition may be associated with a particular area of movement or a particular depth of movement within a 3D focus area. In particular, the three-dimensional focus area in which movement is detected may be divided into three-dimensional portions, where movements made in each of the portions may be interpreted under different selections of behavior definitions. For example, one three-dimensional portion of a focus area may be considered an "active region" where movement detected within the area is compared with a selection of behavior definitions associated with that particular active region, such as a region within a particular distance of a security point.

Additionally, behavior database 112 may include, in a separate definitions database or integrated into the definitions database, behavior definitions specified for animals in general, specific types of animals, animals in particular environments, and particular animals. In addition, a behavior definition for an animal may vary based on the supervising user to which potentially adverse behavior is reported or based on the supervising user with which an animal is interacting.

The behavior definitions included within behavior database 112 may be added to or adjusted based on user feedback of a monitored user or supervising user. For example, behavior database 112 may learn additional behavior definitions and adjust the parameters of already learned behavior definitions through a supervising user responding to warning instructions of potentially adverse behaviors to indicate whether the prediction is correct, in a similar manner as a speech recognition system is trained, to more accurately map and predict behaviors in general, within different context, specific to applications, and specific to particular monitored users and supervising users.

When behavior interpreter controller 404 receives data indicative of a monitored user's path, once behavior interpreter controller 404 identifies a behavior, behavior interpreter controller 404 may predict whether a monitored user's behavior with intersect with a protected party or region. For example, once behavior interpreter controller 404 detects that a monitored user is walking a particular direction on a sidewalk outside the entrance to a guarded building and that the monitored user is gritting one's teeth and walking tersely, which is potentially indicative of the user being angry, behavior interpreter controller 404 may predict whether the monitored user's path will turn towards an area monitored by one of the supervising guards and generate a behavior record for use by a warning system providing warning signals to the supervising guards.

Behavior interpreter controller 404 may output predicted adverse behavior output 108 in the form of one or more behavior records, such as behavior record 420. Behavior record 420 indicates the "behavior type", "probability %" as the behavior", and "probability % as an adverse behavior". In addition, behavior record 420 includes the start X, Y, and Z axis properties and ending X, Y, and Z axis properties of the detected behavior, indicative of the location, direction of movement, and speed of movement of the behavior, listed as "start_x_pos", "end_x_pos", "start_y_pos", "end_y_pos", "start_z_pos", "end_z_pos". Although not depicted, behavior record 420 may also indicate the X, Y, and Z axis start and ending properties of monitored user movement, indicative of the location, direction of movement, and speed of movement of the monitored user or supervising user. Further, additional information acquired from sensors, such as RFID data, GPS coordinates, skin surface characteristics, and other sensed data, may be associated with a particular behavior record or included in a separate object record.

In passing behavior record 420, behavior interpreter controller 404 may filter out particular types of behavior records. For example, behavior interpreter controller 404 may not pass records where the predictability of a behavior as an adverse behavior is less than a particular percentage.

It is important to note that in an alternate embodiment, behavior interpreter controller 404 may only predict a behavior type and percentage probability that the detected images represent the predicted behavior and then also pass records for all detected behaviors to a behavior-enabled application. The behavior-enabled application then predicts which behaviors may be adverse and controls how the supervisor is informed of potentially adverse behavior.

Figure 5:
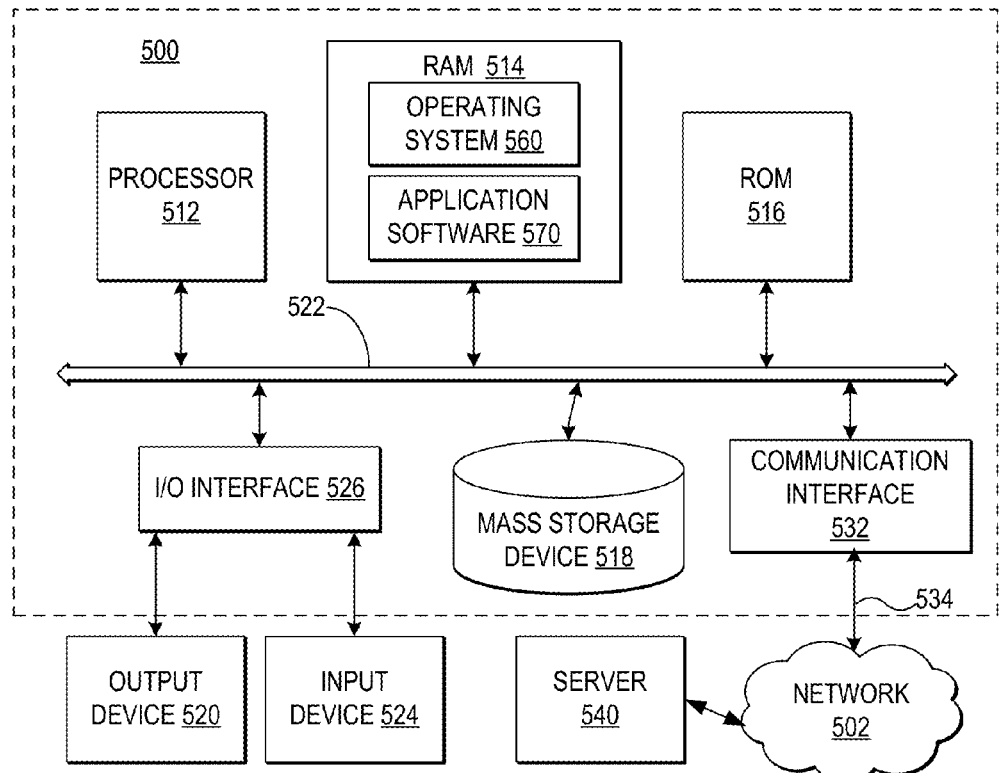
FIG. 5 is a block diagram illustrating one embodiment of a computing system in which the present invention may be implemented.

With reference now to FIG. 5, a block diagram depicts one embodiment of a computing system in which the present invention may be implemented. The controllers and systems of the present invention may be executed in a variety of systems, including a variety of computing systems, such as computer system 500, communicatively connected to a network, such as network 502.

Computer system 500 includes a bus 522 or other communication device for communicating information within computer system 500, and at least one processing device such as processor 512, coupled to bus 522 for processing information. Bus 522 preferably includes low-latency and higher latency paths that are connected by bridges and adapters and controlled within computer system 500 by multiple bus controllers. When implemented as a server, computer system 500 may include multiple processors designed to improve network servicing power. Where multiple processors share bus 522, an additional controller (not depicted) for managing bus access and locks may be implemented.

Processor 512 may be a general-purpose processor such as IBM's POWERPC® processor that, during normal operation, processes data under the control of an operating system 560, application software 570, middleware (not depicted), and other code accessible from a dynamic storage device such as random access memory (RAM) 514, a static storage device such as Read Only Memory (ROM) 516, a data storage device, such as mass storage device 518, or other data storage medium. In one example, processor 512 may further implement the CellBE architecture to more efficiently process complex streams of data in 3D. It will be understood that processor 512 may implement other types of processor architectures. In addition, it is important to note that processor 512 may represent multiple processor chips connected locally or through a network and enabled to efficiently distribute processing tasks.

In one embodiment, the operations performed by processor 512 may control 3D behavior detection from captured images and data for an environment contemporaneous with a supervisor monitoring the environment, adverse behavior prediction from the detected behavior, and output of indicators of the predicted adverse behavior to the supervisor depicted in the operations of flowcharts of FIGS. 11-14 and other operations described herein. Operations performed by processor 512 may be requested by operating system 560, application software 570, middleware or other code or the steps of the present invention might be performed by specific hardware components that contain hardwired logic for performing the steps, or by any combination of programmed computer components and custom hardware components.

The present invention may be provided as a computer program product, included on a computer or machine-readable medium having stored thereon the executable instructions of a computer-readable program that when executed on computer system 500 cause computer system 500 to perform a process according to the present invention. The terms "computer-readable medium" or "machine-readable medium" as used herein refer to any data storage medium that participates in providing instructions to processor 512 or other components of computer system 500 for execution. Such a data storage medium may take many forms including, but not limited to, storage type media, such as non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other data storage medium from which computer system 500 can read and which is suitable for storing instructions. In the present embodiment, an example of a non-volatile medium is mass storage device 518 which as depicted is an internal component of computer system 500, but will be understood to also be provided by an external device. Volatile media include dynamic memory such as RAM 514.

In one example, where processor 512 includes multiple processor elements, then a processing task distributed among the processor elements, whether locally or via a network, may represent a computer program product, where the processing task includes program instructions for performing a process or program instructions for accessing JAVA™ objects or other executables for performing a process. A communications interface 532, coupled to bus 522, provides a two-way data communications coupling to a network link 534 (e.g. a modem or network connection) that may be connected, for example, to a local area network (LAN), wide area network (WAN), or directly to an Internet Service Provider (ISP), for communicating with another computer, such as server 540. In particular, network link 534 may provide wired and/or wireless network communications to one or more networks, such as network 502. Further, although not depicted, communication interface 532 may include software, such as device drivers, hardware, such as adapters, and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Network link 534 and network 502 both use electrical, electromagnetic, or optical signals that carry digital data streams. The signals through the various networks and the signals on network link 534 and through communication interface 532, which carry the digital data to and from computer system 500, may be forms of carrier waves transporting the information.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, a body scanning system, a keyboard, a mouse, or other input peripheral device, communicatively enabled on bus 522 via I/O interface 526 controlling inputs. In addition, for example, an output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
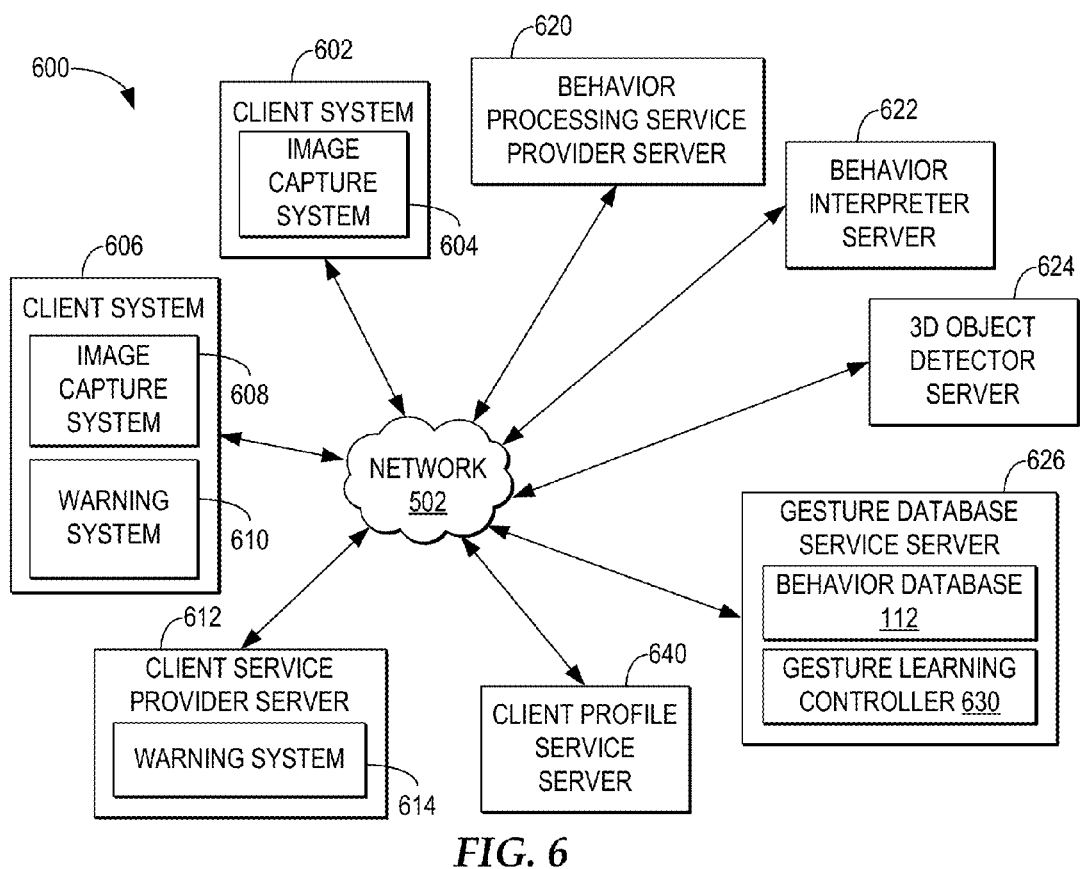
FIG. 6 is a block diagram depicting one example of a distributed network environment in which a behavior-enabled warning method, system, and program may be implemented.

Referring now to FIG. 6, a block diagram depicts one example of a distributed network environment in which a behavior-enabled warning method, system, and program may be implemented. It is important to note that distributed network environment 600 is illustrative of one type of network environment in which the behavior-enabled warning method, system, and program may be implemented, however, the behavior-enabled warning method, system, and program may be implemented in other network environments. In addition, it is important to note that the distribution of systems within distributed network environment 600 is illustrative of a distribution of systems; however, other distributions of systems within a network environment may be implemented. Further, it is important to note that, in the example, the systems depicted are representative of the types of systems and services that may be accessed or request access in implementing a behavior processing system and a behavior-enabled warning system. It will be understood that other types of systems and services and other groupings of systems and services in a network environment may implement the behavior processing system and behavior-enabled warning system.

As illustrated, multiple systems within distributed network environment 600 may be communicatively connected via network 502, which is the medium used to provide communications links between various devices and computer communicatively connected. Network 502 may include permanent connections such as wire or fiber optics cables and temporary connections made through telephone connections and wireless transmission connections, for example. Network 502 may represent both packet-switching based and telephony based networks, local area and wide area networks, public and private networks. It will be understood that FIG. 6 is representative of one example of a distributed communication network for supporting a behavior processing system and behavior-enabled warning system; however other network configurations and network components may be implemented.

The network environment depicted in FIG. 6 may implement multiple types of network architectures. In one example, the network environment may be implemented using a client/server architecture, where computing systems requesting data or processes are referred to as clients and computing systems processing data requests and processes are referred to as servers. It will be understood that a client system may perform as both a client and server and a server system may perform as both a client and a server, within a client/server architecture. In addition, it will be understood that other types of network architectures and combinations of network architectures may be implemented.

In the example, distributed network environment 600 includes a client system 602 with an image capture system 604 and a client system 606 with an image capture system 608. In one example, image capture systems 604 and 608 include are stereoscopic image devices implementing one or more image capture devices, such as image capture devices 202 and 204, and may include one or more sensors, such as sensor 240. Image capture systems 604 and 608 capture images and other data and stream the images and other data to other systems via network 502 for processing. In addition, image capture systems 604 and 608 may include video processors for tracking object properties, such as video processor 316 and video processor 318, described with reference to FIG. 3 and a geometry processor for generating streams of 3D object properties, such as geometry processor 320, described with reference to FIG. 3.

In one example, each of client system 602 and client system 606 may stream captured image frames to one or more behavior detection services. In one example, an behavior processing service provider server 620 provides a service that includes both an object detector service, such as 3D object detector 104, for processing streamed images and other data and an behavior interpreter service, such as behavior interpreter 106, for predicting a type of behavior, predicting a probability that the captured images represent the predicted type of behavior, and predicting the probability that the behavior is adverse, and controlling output of the predicted behavior records to one or more other systems accessible via network 502.

As to behavior processing service provider server 620, different entities may implement a behavior processing service and different entities may access the behavior processing service. In one example, a user logged into one of client systems 602 or client system 606 may subscribe to the behavior processing service. In another example, an image capture system or a particular application requesting behavior processing may automatically stream captured images and data to the behavior processing service. In yet another example, a business or other entity may implement the behavior processing service in a communications network.

In another example, each of client system 602 and client system 606 may stream captured frames to a 3D object detector server 624. 3D object detector server 624 receives captured images and other data from image capture systems, such as image capture system 604 or image capture system 608, and processes the images and other data to generate 3D object properties of detected behaviors, for output to a behavior interpreter system, such as behavior interpreter server 622 or behavior processing service provider server 620. In additional or alternate embodiments, an object detector service may be implemented within one or more other systems, with one or more other services performed within those systems. In particular, in additional or alternate embodiments, an object detector service may be implemented within a client system at which the images and other data are captured.

In particular to behavior interpreter server 622 and 3D object detector server 624, each of these servers may be distributed across one or more systems. In particular, each of behavior interpreter server 622 and 3D object detector server 624 are distributed across systems with 3D image processing power, including processors with the CellBE architecture programmed to perform efficient 3D data processing. In one example, an entity, such as a business or service provider, may implement separate server systems for object detection and behavior interpretation, wherein multiple behavior interpreter servers are implemented with each behavior interpreter server processing different types of 3D object properties.

Behavior processing service provider server 620, behavior interpreter server 622, and 3D object detector server 624 may locally store a behavior database, such as behavior database 112, of raw images, 3D behavior properties, and behavior definitions. In addition, behavior processing service provider server 620, behavior interpreter server 622 and 3D object detector server 624 may access a behavior database service server 626 that facilitates behavior database 112. As previously described, behavior database 112 may include, but is not limited to, raw images and data, 3D behavior properties, behavior definitions, and object predictions.

In addition, behavior database service server 626 includes a behavior learning controller 630. Behavior learning controller 630 prompts users, whether monitored users or supervising users, to provide samples of particular types of behaviors and prompts users to indicate whether a predicted type of behavior matches an actual behavior and whether a predicted adverse behavior is actually adverse. In addition, behavior learning controller 630 gathers other information that enables behavior learning controller 630 to learn and maintain behavior information in behavior database 112 that when accessed by behavior object detector services and behavior interpreter services, increases the accuracy of generation of 3D object properties and accuracy of prediction of behaviors and the potentially adversity of behaviors from 3D object properties by these services.

Further, behavior processing service provider server 620, behavior interpreter server 622, 3D object detector server 624, or behavior database service server 626 may access additional context information for a user, including a monitored user or supervising user, specifying the types of behaviors that are considered adverse and the types of warnings that can be detected by the user from a client profile service server 640. In addition, client profile service server 640 may monitor and provide additional information about a location of a user from monitored information such as the current location of the user, the current physical environment in which the user is located, the events currently scheduled for a user. In one example, client profile service provider 640 monitors a user's electronic calendar or a user's current GPS location, for example, from the user's personal, portable telephony device.

Behavior processing service provider server 620 and behavior interpreter server 622 stream predicted behavior records, such as behavior records 420, to behavior-enabled applications via network 502. In the example embodiment, client system 606 includes a warning system 610 which is a behavior-enabled application, enabling client system 606 to determine and output warning signals based on behavior records and other data, to a supervising user. Warning system 610 at client system 606 may receive predicted behavior records from client system 606, as captured by image capture system 608, or may receive predicted behavior records based on images and data detected by image capture system 608 or other image capture devices or image capture systems.

In addition, in the example embodiment, client service provider server 612 includes a warning system 614 which is a behavior-enabled service for enabling client service provider server 612 to determine and output warning signals based on behavior records and other data. Client service provider server 612 represents a server which provides a warning service to one or more subscribing client systems. Warning system 614 may receive behavior records for a particular environment from one or more systems and determine and output warning signals to one or more client systems.

Figure 7:
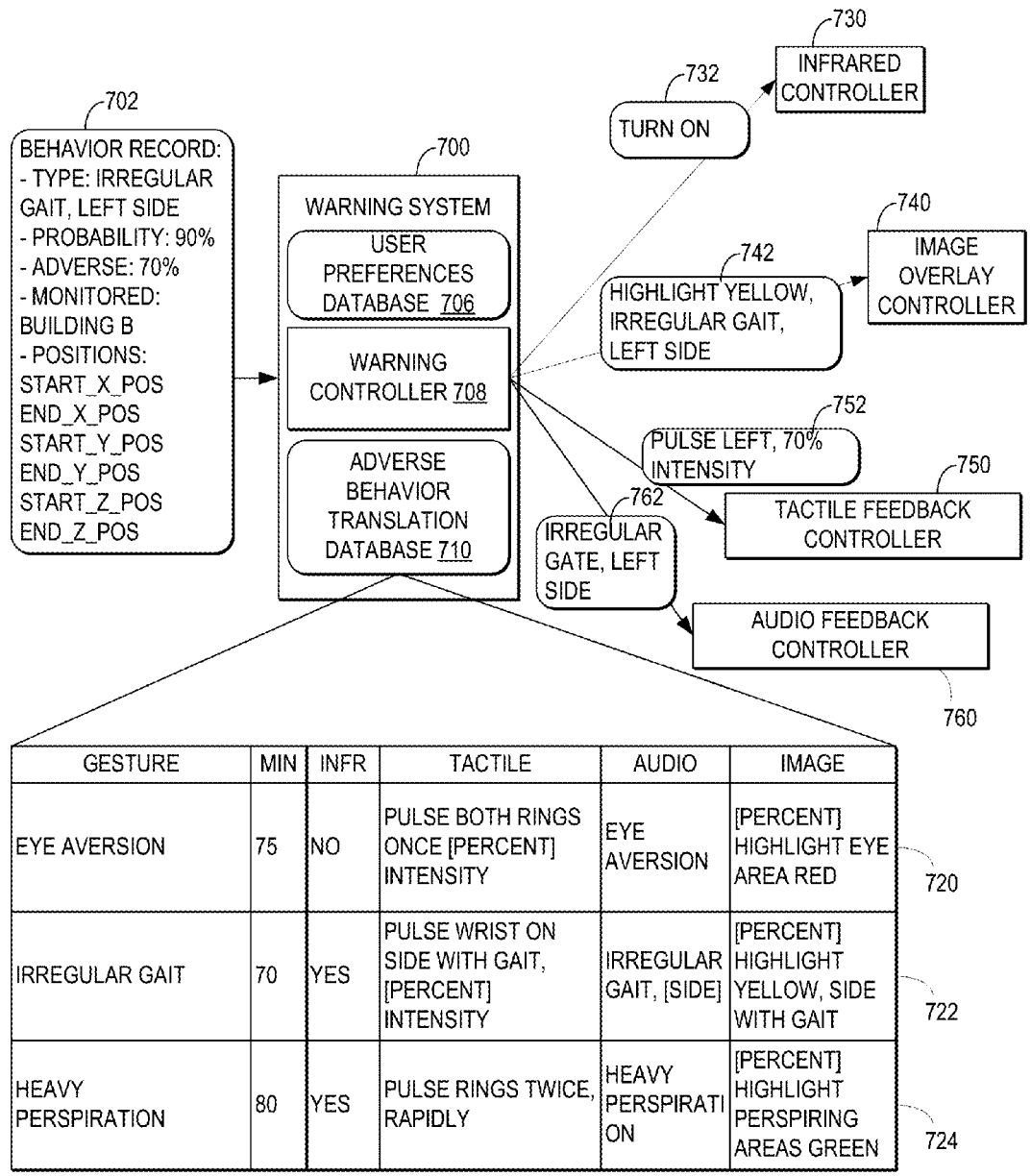
FIG. 7 is a block diagram illustrating one example of an implementation of a behavior interpreter system communicating with a behavior-enabled warning system.

With reference now to FIG. 7, a block diagram illustrates one example of an implementation of a behavior interpreter system communicating with a behavior-enabled warning system. Warning system 700 receives predicted behavior records from behavior processing system 100, which enables warning system 700 to provide warning output based on real-time, 3D images and other data captured for an actual environment a supervisor is monitoring. According to an advantage, warning system 700 may control warning signals to output devices that control output of the warning signals so that only the supervising user detects the warning signals and the warning signals are undetectable to the monitored user.

In particular, warning controller 708 of warning system 700 may base warning instructions on behavior records, such as behavior record 702. In addition, warning controller 708 may enhance or generate warning instructions based on other data, combined with the data included in behavior record 702. For example, warning controller 708 may access static or dynamic information about an environment being monitored, through accessing structural maps, photographs, video streams, RFID information, and other data about a monitored environment. In addition, warning controller 708 may access information about a monitored user within an environment, through other imaging devices. Then, warning controller 708 may generate a mapping of the predicted behavior records at locations within the monitored environment.

In particular, in the example, behavior system 720 receives behavior record 702 and warning controller 708 translates behavior record 702 into inputs that facilitate modeling of an environment and generation of warning instructions to a supervising user. In the embodiment depicted, in translating behavior record 702, warning controller 708 accesses behavior translation database 710 to translate a type of behavior, a percentage probability of the type of behavior, and a percentage probability that the behavior is adverse, into warning instructions based on the type of device to which the warning instructions will be output. In other embodiments, behavior records may be translated into other types of data usable by warning controller 708 for implementing a warning system. A user preferences database 706 may specify preferences as to the type of device to which the warning instructions will be output and additional filtering preferences for use in filtering adverse behavior translation database 710. In addition, adverse behavior translation database 710 may be associated with a particular supervising user or selected according to other criteria from among a selection of multiple adverse behavior translation databases available to warning system 700.

In the example, adverse behavior translation database 710 includes, for each entry, data specified in multiple categories. In particular, in the example, each entry includes a gesture type and a minimum (min) adverse behavior percentage and then instructions for generating warning signals, if applicable, to each of an infrared controller, a tactile feedback device, an audio feedback device, and an image overlay controller. In addition, although not depicted, each entry may include a minimum threshold probability percentage that the behavior type is correctly predicted and instructions for generating warning signals for additional or alternate types of warning system output devices.

In particular, in the example, a monitored behavior included in behavior record 702 indicates that a monitored user is walking with an irregular gait, with a probability of 90% certainty that the monitored behavior is an irregular gate on the left side, and with a 70% certainty that the irregular gate represents adverse behavior. In addition, behavior record 702 indicates a general monitored environment as "building B". It is important to note that the examples of data included in predicted behavior record 702 are illustrative of, but not limiting of, the types of data and the detail of data that may be included in behavior records output by behavior processing system 100 and received by a warning system 700. For example, a behavior record could also indicate the speed at which the monitored user is walking, the direction the monitored user is walking, and information that would identify the monitored user, such as a shirt color or hair color, if a monitored environment includes more than one monitored user.

In the example, warning controller 708 may control warning instructions to one or more of the devices illustrated. For the example, warning controller 708 compares behavior record 702 with entry 722 of adverse behavior translation database 720 and may control warning signals to one or more of an infrared controller 730, an image overlay controller 740, a tactile feedback controller 750, and an audio feedback controller 760 based on instructions generated from comparing behavior record 702 and other collected data with entry 722. It will be understood that warning controller 708 may output warning signals to additional or alternate types of output devices and to multiple of a same type of output device.

In controlling warning instructions based on behavior record 702, in one example, warning controller 708 may determine that a signal needs to be sent to turn on infrared controller 730 within the environment of "building B". Warning controller 708 determines that infrared controller 730 controls an infrared device for monitoring "building B". Warning controller generates a warning signal and sends the warning signal to infrared controller 730, as illustrated at reference numeral 732, to turn on an infrared system. In addition to directing infrared controller 730 to turn on the infrared system, warning controller 708 may provide additional instructions to enable infrared controller 730 to focus on a monitored user.

In another example, in controlling warning instructions based on behavior record 702, warning controller 708 may determine that a signal needs to be sent to image overlay controller 740 for the images captured within "building B". In the example, image overlay controller 740 controls overlaying an image layer on a captured image stream. An image layer may include, but is not limited to, a text image, a graphical image, and a video image. In one example, a transparent colored overlay may be positioned as an image layer over a captured video image within "building B" to indicate a portion of a monitored user triggering an indicator of potentially adverse behavior. For example, warning controller 708 sends a warning signal illustrated at reference numeral 742 directing image overlay controller 740 to focus an image layer on the irregular gait on the left side. In addition, warning controller 708 may send behavior record 702, with indicators of the coordinates of the detected behavior, such that image overlay controller 740 may map the image layer indicating the irregular gait to one of the image streams previously captured or currently captured.

In yet another example, in controlling warning instructions based on behavior record 702, warning controller 708 may determine that a signal needs to be sent to tactile feedback controller 750. Tactile feedback controller 750 controls output to one or more tactile feedback devices. Tactile feedback characteristics may include, but are not limited to, a pulse strength, intensity, pattern, duration, and position. In addition, a supervising user may detect tactile feedback from one or more tactile feedback devices, wherein warning controller 708 may generate a same signal or different signals for multiple tactile feedback devices. In the example, warning controller 708 sends a warning signal illustrated at reference numeral 752 directing tactile feedback controller 750 to pulse the left tactile feedback device with 70% strength.

Further, in another example, in controlling warning instructions based on behavior record 702, warning controller 708 may determine that a signal needs to be sent to audio feedback controller 760. Audio feedback controller 760 controls output to one or more audio feedback devices. Warning controller 708 may control different types of audio feedback, including but not limited to, tonal sounds that create a warning signal tonal pattern and text converted to speech feedback. In the example, warning controller 708 sends a warning signal illustrated at reference numeral 762 directing audio feedback controller 760 to output an audio signal of "irregular gate, left side".

In addition to entry 722, entries 720 and 724 of adverse behavior translation database 710 are further illustrative of types of entries that may be included in adverse behavior translation database 710. For example, entry 720 specifies that for a gesture indicated as "eye aversion", with a minimum adversity of 75%, no infrared controller should be triggered, but instructions are specified for formatting a warning signal to a tactile feedback controller to pulse both tactile rings once at the percent intensity, an audio feedback controller to provide audio feedback of "eye aversion", or an image overlay controller to highlight the eye area red at the adverse percent transparency. In another example, entry 724 specifies that for a gesture indicated as "heavy perspiration", with a minimum adversity of 80%, an infrared controller should be triggered if specified in user preferences database 706 and instructions are specified for formatting a warning signal to a tactile feedback controller to pulse both tactile rings rapidly twice, an audio feedback controller to provide audio feedback of "heavy perspiration", or an image overlay controller to highlight perspiring areas in green at the adverse percentage transparency.

In the example, warning controller 708 controls warning signals that turn on a monitoring device through infrared controller 730, that adjust a monitored video image through image overlay controller 740, and that alert an individual supervising user through tactile feedback controller 750 and audio feedback controller 760. Thus, advantageously, warning controller 708 controls output of warning signals to devices where the output of the warning signal is undetectable to the monitored user. In an environment where a monitored user may be able to view the images controlled by image overlay controller 740, user preferences database 706 may exclude output to image overlay controller 740.

Figure 8:
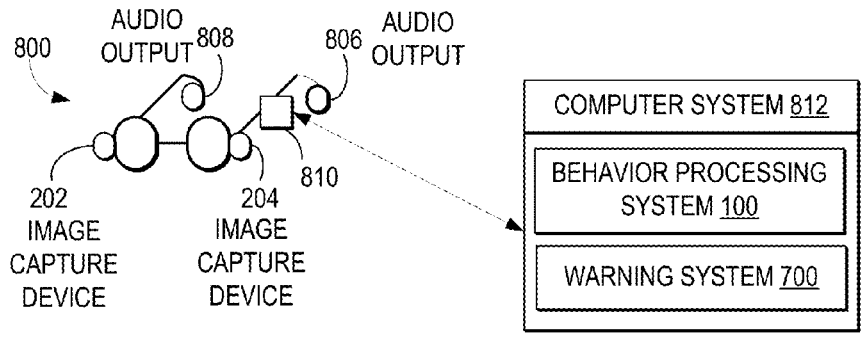
FIG. 8 is a block diagram depicting one example of an object detection interface and a navigation output interface.

With reference now to FIG. 8, a block diagram illustrates one example of an object detection interface and a navigation output interface. In the example, FIG. 8 includes a headpiece 800, which is a wearable apparatus. In one example, a supervising user wears headpiece 800, which is illustrated as a pair of glasses. In an additional or alternate embodiment, headpiece 800 may represent other types of wearable apparatus. In addition, while headpiece 800 is described with reference to a supervising user wearing headpiece 800, in alternate embodiments, a monitored user may wear headpiece 800.

In the example, image capture device 202 and image capture device 204 are each affixed to headpiece 800. Each of image capture device 202 and image capture device 204 capture video image streams and other types of sensed data. Each of image capture devices 202 and image capture device 204 may transmit images and data to a computer system 912 implementing a behavior processing system 100 through a wired connection or through transmissions by a wireless transmitter 810 affixed to headpiece 800.

In one example, computer system 812 is a local, mobile computing system, such as computer system 500, carried or worn by a supervising user wearing headpiece 800. For example, computer system 812 as a local, mobile computing system may be implemented in, for example, a hip belt attached computing system, a wireless telephony device, or a laptop computing system. In another example, computer system 812 remains in a fixed position or is worn by one supervising user, but receives wireless transmissions from wireless transmitter 810 or other wireless transmitters within the broadcast reception range of a receiver associated with computer system 812.

Behavior processing system 100 may run within computer system 812 or may interface with other computing systems providing behavior processing services to process captured images and data and return a predicted gesture from the captured images and data, as illustrated in FIG. 6. In particular, computer system 812 may include a wired or wireless network interface through which computer system 812 interfaces with other computing systems via network 502.

In one example, image capture device 202 and image capture device 204 are positioned on headpiece 800 to capture a focus area from directly in front of the user to a distance extended in front of the supervising user, such as several yards in front of the supervising user. By the focus area including the area directly in front of the user, image capture device 202 and image capture device 204 may capture images of behaviors made by the supervising user wearing headpiece 800. In addition, by the focus area including the area extending in front of the supervising user, image capture device 202 and image capture device 204 may capture images of behaviors of monitored users within the path of the supervising user. Further, image capture device 202 and image capture device 204 may be positioned on headpiece 800 to capture areas to the side, above, and behind a supervising user, dependent upon an environment in which a supervising user is within. Behavior processing system 100 processes the images and data captured by image capture device 202 and image capture device 204, and, based on learning the types of behavior recognition most helpful to the supervising user, passes predicted obstacle records to warning system 700 for output to the supervising user.

In warning system 700 controlling outputs to the supervising user, in the example, warning system 700 may send audio feedback to headpiece 800, where headpiece 800 includes an audio output device 806 and an audio output device 808 affixed to headpiece 800 and positioned as earpieces for output of audio in a user's ears. Each of audio output device 806 and audio output device 808 may receive audio transmission for output from computer system 812 via a wired connection or from wireless transmitter 810, as directed by warning system 700.

In one example, image capture device 202 and image capture device 204 capture the image of a monitored user approaching the supervising user and behavior processing system 100 receives the captured images and predicts the behavior of the monitored user and whether the behavior is potentially adverse behavior. Behavior processing system 100 passes the behavior types and whether the behaviors are predicted as adverse behaviors in a predicted behavior record to warning system 700. As previously described with reference to FIG. 7, warning system 700 translates the predicted behavior record into audio output and controls output of the translated audio into audio output device 806 and audio output device 808. Advantageously, by controlling output of warning signals to audio output device 806 and audio output device 808 worn by a supervising user, only the supervising user, and not the monitored user, receives the audio output warning signals.

It is important to note that while in the example, image capture device 202, image capture device 204, audio output device 806, and audio output device 808 are affixed to a same headpiece 800, in alternate embodiments, the image capture devices may be affixed to a separate headpiece from the audio output devices. In addition, it is important to note that while in the example, computer system 812 includes both behavior processing system 100 and warning system 700, in an alternate embodiment, different computing systems may implement each of behavior processing system 100 and warning system 700.

In addition, it is important to note that multiple supervising users and monitored users may each wear a separate headpiece, where the images captured by the image capture devices on each headpiece are transmitted to a same computer system, such as computer system 812, via a wireless or wired network connection. By gathering collaborative images and data from multiple people, behavior processing system 100 may more accurately detect objects representative of behaviors and more accurately predict the type of behavior and whether the behavior is potentially adverse. Further, it is important to note that multiple local mobile computer systems, each gathering images and data from image capture devices and sensors affixed to a headpiece may communicate with one another via a wireless or wired network connection and share gathered images, data, detected objects, predicted behaviors, and whether the predicted behaviors are potentially adverse. Supervising users may agree to share gathered images and predicted behavior records within a secured network.

Where collaborative images and data are gathered at a single system or shared among multiple systems, additional information may be added to or extracted from the images and data to facilitate the placement of different sets of captured images and data relative to other sets of captured images and data. For example, images and data transmitted for collaboration may include location indicators and orientation indicators, such that each set of images and data can be aligned and orientated to the other sets of images and data.

Figure 9:
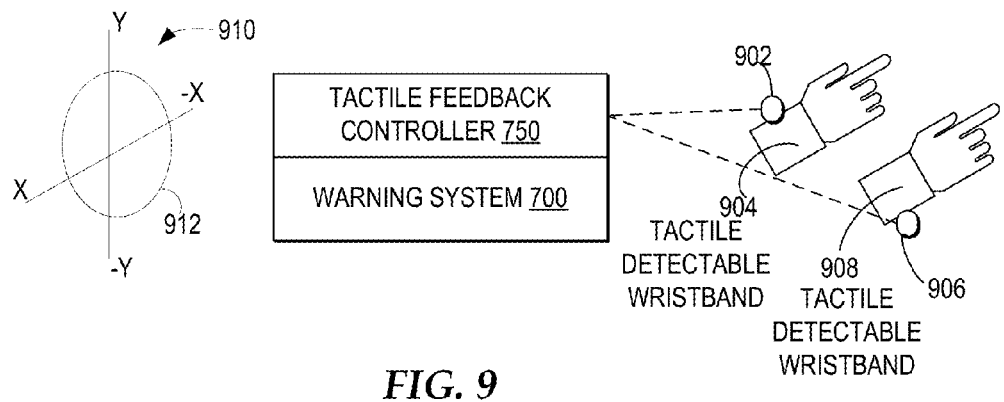
FIG. 9 is an illustrative diagram illustrating one example of tactile detectable feedback devices receiving tactile feedback from a warning system.

Referring now to FIG. 9, an illustrative diagram illustrates one example of tactile detectable feedback devices receiving tactile feedback from a warning system. As illustrated, a person may wear wristbands 904 and 908, which each include controllers for controlling tactile detectable outputs and hardware which can be controlled to create the tactile detectable outputs. Examples of tactile detectable outputs may include detectable pressure pulses, detectable changes in the surface of the wristbands, and other adjustments that can be sensed by the user wearing wristbands 904 and 908. In addition, tactile detectable outputs may be adjusted in frequency, intensity, duration, and other characteristics that can be sensed by the supervising user wearing wristbands 904 and 908.

In the example, wristband 904 includes a wireless transmitter 902 and wristband 908 includes a wireless transmitter 906. Each of wireless transmitter 902 and wireless transmitter 906 communicate via a wireless network transmission to tactile feedback controller 750. Tactile feedback controller 750 receives tactile signals from warning system 700 and transmits signals to each of wireless transmitters 902 and 906 to direct tactile output from wristband 904 and wristband 908. Advantageously, by controlling output of warning signals to wristband 904 and wristband 908 worn by a supervising user, only the supervising user, and not the monitored user, detects the tactile output warning signals.

In particular, warning system 700 transmits tactile warning signals to each of wireless transmitters 902 and 906 for controlling the pulse patterns, positions, force, durations, frequency, and timing of outputs around the circumference of each wristband. In an example illustrated at reference numeral 910, warning system 700 sends tactile signals for controlling a band 912 where each tactile signal includes an x and a y coordinate and force. The pattern and positions of pulses may vary in width, such as from the y position to the x position, and direction, such as rotating pulse clockwise around a wristband.

Additionally, each of wireless transmitters 902 and 906 may include sensors to monitor the relative position of each of wristbands 904 and 908 compared with the force of gravity. Referring to the example illustrated at reference numeral 910, as a user wearing band 912 rotates the user's arm, the y position for controlling tactile outputs would always remain up and the −y position would also remain down, relative to the force of gravity, such that the tactile signals are re-positioned about the depicted axis based on the current position of the user's arm.

In one example, warning system 700 translates a predicted behavior and a percentage probability that the predicted behavior is potentially adverse into a tactile output that uniquely indicates, to the supervising user, the behavior type and percentage probability that the behavior is potentially adverse, as illustrated in the example entries 720, 722, and 724. In another example, however, warning system 700 may translate a predicted behavior and percentage probability that the predicted behavior is potentially adverse into a tactile output that directs the supervising user to the area of a monitored user associated with the predicted behavior and the probability that the behavior is adverse. Further, in yet another example, warning system 700 may translate a predicted behavior and percentage probability into a tactile output that directs the supervising user to physically respond in some way, such as lifting an arm, reaching for a defensive device, or other responses which the supervising user can detect from tactile output.

It is important to note, that wristbands 904 and 908 are examples of one type of tactile feedback devices located in two fixed positions; in alternate embodiments, other types of tactile feedback devices may be implemented, one or more tactile devices may be implemented, and tactile devices may be detectable in one or more locations. For example, many telephony devices already include a vibration feature that warning system 700 may control by sending signals to control vibrations representative of predicted behaviors and percentage probability that the predicted behavior is potentially adverse. In another example, a supervising user may wear a tactile detectable glove which functions as a Braille device or 3D "feel" device with tactile adjustable interfaces in the fingertips of the glove.

It is important to note that a user may wear both headpiece 800 and tactile detectable wristbands 904 and 908. In this example, warning system 700 would control output to either or both of tactile feedback controller 750 and wireless transmitter 810. Further, headpiece 800 may include a microphone (not depicted) that detects when the audio around a user and warning system 700 may select to output audio feedback when the noise is below a particular level and to output a tactile detectable output when the noise is above a particular level.

With reference now to FIG. 10, an illustrative diagram depicts one example of an environment in which the potentially adverse behaviors of a monitored user are detected and communicated by a warning system to a supervising user. In the example, an environment 1010 includes a supervising user 1012, such as a law enforcement officer, and a monitored user 1014. In the example, supervising user 1012 steps out of a vehicle 1006. Vehicle 1006 includes image capture system 1004, such as one or more of image capture device 202, image capture device 204, and sensor 240, for capturing images representing behavior movement within an environment 1010. Image capture system 1004 pass the captured data to gesture processing system 100 of computer system 812, where computer system 812 may be located within vehicle 1006 or representative of one or more computer systems accessible via a network 502.

Behavior processing system 100 processes the images captured by image capture system 1004. In the example behavior processing system 100 receives the images from vehicle 1006 with indications of the type of patrol performed by the officer and the officer's identity. In view of the officer as performing traffic stops and the officer identity of "officer A", behavior processing system 100 access traffic stop behavior definitions 1020 and officer A behavior definitions 1022 to more accurately predict behaviors common during a traffic stop and to more accurately predict behaviors relevant to a traffic stop and relevant to "officer A" as defined in definitions 1020 and 1022.

Behavior processing system 100 generates predicted behavior records for use by warning system 700 in determining warning instructions for output to supervising user 1012 via output controllers 1008. In determining warning instructions to output to supervising user 1012, warning system 700 may access user preferences for "officer A", preferences set for a traffic stop and an adverse behavior translation database for "officer A" or for officers in general.

Based on the warning instructions generated by warning system 700, warning system 700 controls output signals to output controllers 1008 for controlling output to output devices accessible to supervising user 1012 outside vehicle 1006 and output devices controlled from vehicle 1006. For example, supervising user 1012 may wear headphones to which output controllers 1008 control output of an audio signal or supervising user 1012 may wear tactile detectable devices to which output controllers 1008 control output of tactile signals. In another example, vehicle 1006 may be equipped with an infrared device to which output controllers 1008 output a signal to control whether the infrared device turns on and the positioning of the capture area of the infrared device. It will be understood that output controllers 1008 may control output signals to other types of output devices within vehicle 1006 or accessible to supervising user 1012. In addition, output controllers 1008 may control output signals to output devices accessible to multiple supervising users or to all supervising users within a particular distance to output controllers 1008. Further, warning system 1008 may control signals to other output controllers at other vehicles or other positions to which warning system 1008 communicates.

It is important to note that any type of mobile unit, such as vehicle 1006, may implement a behavior processing system and warning system for providing warning signals to a supervising user. In addition, while vehicle 1006 is a mobile unit, in other examples, a unit, such as a unit at a security checkpoint or public transportation entry point, may implement a behavior processing system and warning system for providing warning signals to a supervising user.

In addition, it is important to note that while the example in FIG. 10 illustrates a supervising user interacting with a human during a traffic stop, in another example, a mobile unit, such as vehicle 1006, may be implemented to monitor a supervising user interacting with an animal or other moving entity.

Figures 11, 12:
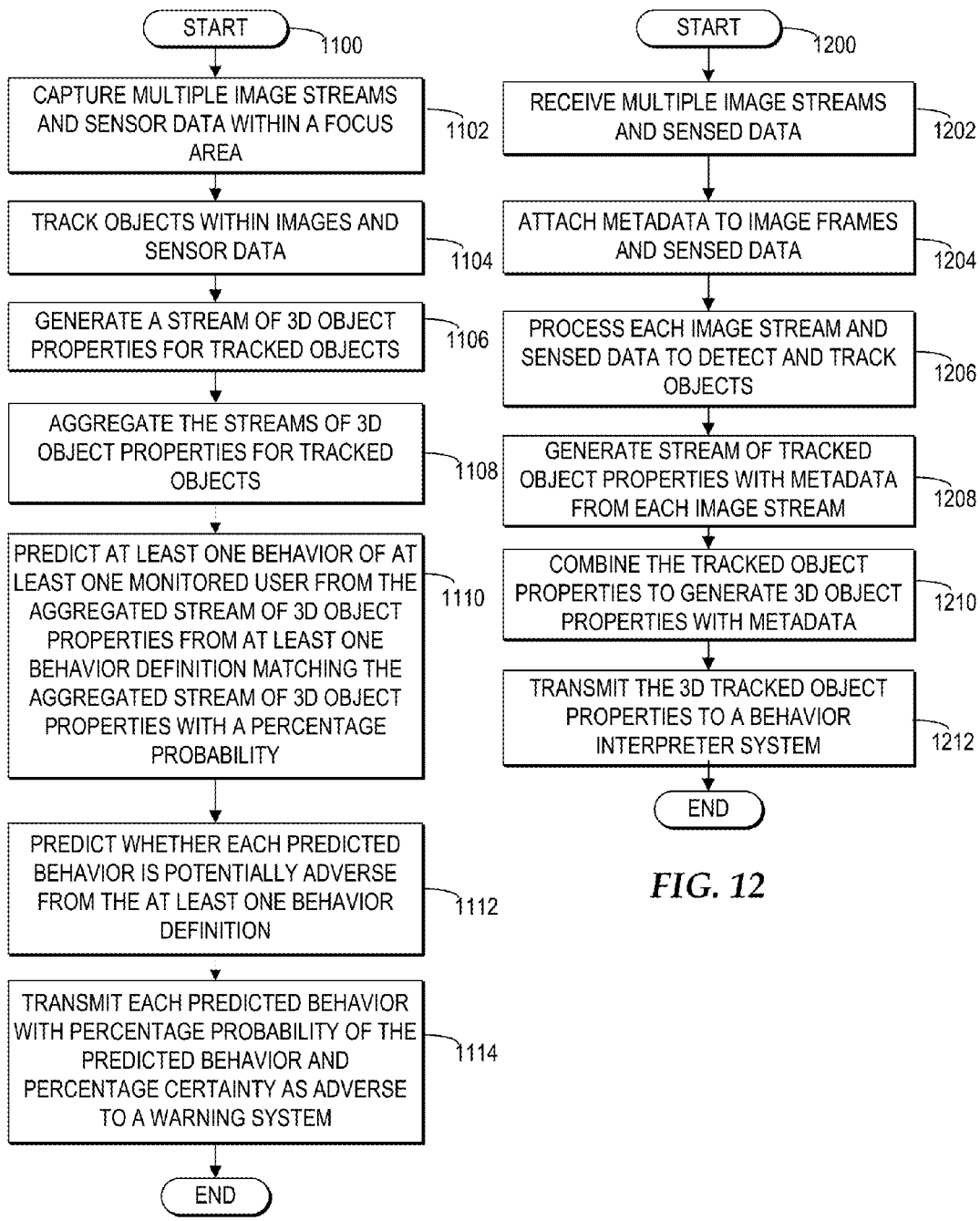
FIG. 11 is a high level logic flowchart illustrating a process and program for a behavior processing system to predict object types and paths with a percentage probability.
FIG. 12 is a high level logic flowchart depicting a process and program for behavior detection by tracking objects within image streams and other sensed data and generating 3D object properties for the tracked objects representative of behaviors.

Referring now to FIG. 11, a high level logic flowchart depicts a process and program for a behavior processing system to predict object types and paths with a percentage probability. In the example, the process starts at block 1100, and thereafter proceeds to block 1102. Block 1102 depicts capturing, via a stereoscopic image device, multiple image streams and via sensors, sensor data, within a focus area. Next, block 1104 illustrates tracking objects within the images and sensor data. Thereafter, block 1106 depicts generating a stream of 3D object properties for tracked objects. Thereafter, block 1108 depicts aggregating the 3D object properties for each of the tracked objects. In particular, the aggregated 3D object properties represent one or more objects tracked in association with at least one monitored user representative of behaviors of the at least one monitored user. In addition, the aggregated 3D object properties may represent one or more objects tracked in associated with one or more supervising users representative of behaviors of the one or more supervising users. Next, block 1110 illustrates predicting at least one type of behavior from the aggregated stream of 3D object properties from one or more behavior definitions that match the aggregated stream of 3D object properties with a percentage of probability. In addition, next, block 1112 depicts predicting whether the behavior is potentially adverse with a percentage probability from the behavior definitions. In particular, in predicting whether a behavior is potentially adverse, the potential adversity of a behavior may change based on the type of environment in which the behavior is performed, the number of people within a particular environment, the proximity of the supervising user to a monitored user, and other factors which may be defined in a behavior definition. Thereafter, block 1114 depicts transmitting each predicted type of behavior and whether the behavior is potentially adverse in behavior records to a behavior-enabled application, such as a warning system, and the process ends.

With reference now to FIG. 12, a high level logic flowchart depicts a process and program for behavior detection by tracking objects within image streams and other sensed data and generating 3D object properties for the tracked objects representative of behaviors. As illustrated, the process starts at block 1200 and thereafter proceeds to block 1202. Block 1202 depicts an object detector system receiving multiple image streams, via one or more image capture devices, and sensed data, via one or more sensors. Next, block 1204 illustrates the object detector system attaching metadata to the image frames and sensed data, and the process passes to block 1206. In one example, metadata includes data such as, but not limited to, a camera identifier, frame number, timestamp, and pixel count.

Block 1206 depicts the object detector system processing each image stream and sensed data to detect and track objects, wherein objects may include physical objects and user movement indicative of a behavior. Next, block 1208 illustrates generating streams of tracked object properties with metadata from each image stream. Thereafter, block 1210 depicts combining the tracked object properties to generate 3D object properties with metadata. Next, block 1212 illustrates transmitting the 3D tracked object properties to a behavior interpreter system, and the process ends.

Referring now to FIG. 13, a high level logic flowchart depicts a process and program for behavior prediction from tracked 3D object properties. In the example, the process starts at block 1300 and thereafter proceeds to block 1302. Block 1302 depicts a determination whether the behavior interpreter system receives 3D object properties. When the behavior interpreter system receives 3D object properties, then the process passes to block 1304. Block 1304 depicts accessing a range of applicable behavior definitions, and the process passes to block 1306.

Block 1306 illustrates the behavior interpreter system comparing the 3D object properties for tracked objects with the applicable behavior definitions. Next, block 1308 depicts the behavior interpreter system detecting at least one behavior definition with a closest match to one or more sets of 3D object properties. Thereafter, block 1310 illustrates calculating a percentage probability that the 3D object properties match the behavior definitions. Next, block 1312 depicts predicting whether the predicted behavior is potentially adverse based on the adversity characteristics set in the behavior definitions. Thereafter, block 1314 illustrates generating at least one predicted behavior record with any predicted behavior, percentage probability that the predicted behavior is correct, percentage probability that the predicted behavior is potentially adverse, and other sensed data. Next, block 1316 depicts transmitting the predicted behavior records with metadata to a particular behavior-enabled application, and the process ends.

With reference now to FIG. 14, a high level logic flowchart depicts a process and program for applying a predicted behavior record in a behavior-enabled navigation system. As illustrated, the process starts at block 1400 and thereafter proceeds to block 1402. Block 1402 depicts a determination whether a behavior-enabled warning system receives a predicted behavior record. When the warning system receives a predicted behavior record, then the process passes to block 1404. Block 1404 illustrates collecting other data associated with a particular environment, including, but not limited to, the locations of other supervising users, other predicted behavior records within the environment, and other data accessible to the warning system. Thereafter, block 1406 depicts mapping the predicted behaviors and other collected data into one or more locations within a supervised environment. Next, block 1408 illustrates translating the predicted behavior records and other collected data into one or more warning signals for output to a supervising user, including warning signals indicative of the locations of the adverse behavior within the environment. Thereafter, block 1410 illustrates controlling output of the signals to the selected output interface controllers, and the process ends.

While the invention has been particularly shown and described with reference to a preferred embodiment, it will be understood by those skilled in the art that various changes in form and detail may be made therein without departing from the spirit and scope of the invention.

What is claimed is:

1. A system, comprising:
   one or more tactile feedback output devices operative to receive one or more warning signals for controlling one or more types of tactile output by the one or more tactile feedback output devices, the one or more warning signals representing that a predicted behavior of a monitored user represents a particular behavior that is potentially adverse and a percentage probability that the predicted behavior is adverse, the monitored user detected within a particular environment monitored by a supervising user, the one or more tactile feedback output devices worn by the supervising user; and the one or more tactile feedback output devices operative to control the one or more types of tactile outputs of the one or more tactile feedback output devices that are detectable by the supervising user wearing the one or more tactile feedback output devices according to the one or more warning signals to specifically alert the supervising user that the predicted behavior of the monitored user represents the particular behavior that is potentially adverse and the percentage probability that the predicted behavior is adverse.

2. The system according to claim 1, further comprising:

a computer system operative to capture a three-dimensional movement of the monitored user within the particular environment monitored by the supervising user, wherein the three-dimensional movement is determined using at least one image capture device aimed at the monitored user;

the computer system operative to identify a three-dimensional object properties stream using the captured movement;

the computer system operative to access a selection of adverse behavior definitions specified for the particular environment from among a plurality of adverse behavior definitions specified for a plurality of environments from a behavior database;

the computer system operative to identify a particular defined adverse behavior of the monitored user represented by the three-dimensional object properties stream by comparing the identified three-dimensional object properties stream with the selection of adverse behavior definitions by calculating a percentage of probability that the captured three-dimensional movement represents the particular behavior defined in the selection of adverse behavior definitions and calculating the percentage of probability that the captured three-dimensional movement is adverse;

the computer system, in response to identifying the particular defined adverse behavior of the monitored user from among the plurality of adverse behavior definitions, operative to notify the supervising user for the particular environment about the particular defined adverse behavior of the monitored user through an interface only detectable by the supervising user by sending the one or more warning signals to the one or more tactile feedback output devices.

3. The system according to claim 2, further comprising:

the computer system operative to capture a response by the supervising user to the supervising user receiving the notification of the particular adverse behavior through the interface of the one or more tactile feedback output devices, wherein the response indicates whether the particular adverse behavior is correctly identified; and adjusting at least one definition in the selection of adverse behavior definitions specified for the particular environment in the behavior database to reflect the response.

4. The system according to claim 1, further comprising:

the computer system operative to translate the particular adverse behavior into the one or more warning signals comprising one or more tactile feedback control signals with a feedback strength specified to a percentage of total feedback strength to reflect the percentage probability that the captured three-dimensional movement is adverse and with a feedback position specified to one or multiple feedback positions to reflect a position of the monitored user of the particular adverse behavior within the particular environment; and the computer system operative to control output of the one or more warning signals comprising the one or more feedback control signals to the one or more tactile feedback output devices detectable by the supervising user only for controlling a feedback strength and a feedback position of the feedback output by the one or more tactile feedback output devices.

5. The system according to claim 1, further comprising:

the one or more tactile feedback output devices each comprising a wireless transmitter for receiving the one or more warning signals via a wireless network transmission from a warning system that transmits the one or more warning signals to the tactile feedback output devices only, the warning system translating the particular adverse behavior and percentage probability into the one or more warning signals.

6. The system according to claim 1, further comprising:

the one or more tactile feedback output devices each comprising a controller for controlling the one or more types of tactile output comprising one or more detectable pressure pulses with adjustable frequency, intensity, duration, and timing; and the controller for specifying the positions of pulses within the one or more detectable pressure pulses and for specifying the frequency, intensity, duration, and timing of the pulses based on the one or more warning signals.

7. The system according to claim 1, further comprising:

the one or more tactile feedback output devices operative to receive the one or more warning signals comprising x and y coordinates;

the one or more tactile feedback output devices operative to detect a relative position of each of the one or more tactile feedback output devices compared with a force of gravity as the supervising user wears the one or more tactile feedback output devices; and the one or more tactile feedback output devices operative to reposition the one or more types of tactile outputs based on the x and y coordinates and the relative position of each of the one or more tactile feedback output devices compared with the force of gravity to maintain the y coordinate as up relative to the force of gravity.

8. A method, comprising:

receiving, by one or more tactile feedback output devices, one or more warning signals for controlling one or more types of tactile output by the one or more tactile feedback output devices, the one or more warning signals representing that a predicted behavior of a monitored user represents a particular behavior that is potentially adverse and a percentage probability that the predicted behavior is adverse, the monitored user detected within a particular environment monitored by a supervising user, the one or more tactile feedback output devices worn by the supervising user; and controlling, by the one or more tactile feedback output devices, the one or more types of tactile outputs of the one or more tactile feedback output devices that are detectable by the supervising user wearing the one or more tactile feedback output devices according to the one or more warning signals to specifically alert the supervising user that the predicted behavior of the monitored user represents the particular behavior that is potentially adverse and the percentage probability that the predicted behavior is adverse.

9. The method according to claim 8, further comprising:
capturing, by a computer system, a three-dimensional movement of the monitored user within the particular environment monitored by the supervising user, wherein the three-dimensional movement is determined using at least one image capture device aimed at the monitored user;
identifying, by the computer system, a three-dimensional object properties stream using the captured movement;
accessing, by the computer system, a selection of adverse behavior definitions specified for the particular environment from among a plurality of adverse behavior definitions specified for a plurality of environments from a behavior database;
identifying, by the computer system, a particular defined adverse behavior of the monitored user represented by the three-dimensional object properties stream by comparing the identified three-dimensional object properties stream with the selection of adverse behavior definitions by calculating a percentage of probability that the captured three-dimensional movement represents the particular behavior defined in the selection of adverse behavior definitions and calculating the percentage of probability that the captured three-dimensional movement is adverse;
in response to identifying the particular defined adverse behavior of the monitored user from among the plurality of adverse behavior definitions, notify, by the computer system, the supervising user for the particular environment about the particular defined adverse behavior of the monitored user through an interface only detectable by the supervising user by sending the one or more warning signals to the one or more tactile feedback output devices.

10. The method according to claim 9, further comprising:
capturing, by the computer system, a response by the supervising user to the supervising user receiving the notification of the particular adverse behavior through the interface of the one or more tactile feedback output devices, wherein the response indicates whether the particular adverse behavior is correctly identified; and
adjusting, by the computer system, at least one definition in the selection of adverse behavior definitions specified for the particular environment in the behavior database to reflect the response.

11. The method according to claim 8, further comprising:
translating, by the computer system, the particular adverse behavior into the one or more warning signals comprising one or more tactile feedback control signals with a feedback strength specified to a percentage of total feedback strength to reflect the percentage probability that the captured three-dimensional movement is adverse and with a feedback position specified to one or multiple feedback positions to reflect a position of the monitored user of the particular adverse behavior within the particular environment; and
controlling, by the computer system, output of the one or more warning signals comprising the one or more feedback control signals to the one or more tactile feedback output devices detectable by the supervising user only for controlling a feedback strength and a feedback position of the feedback output by the one or more tactile feedback output devices.

12. The method according to claim 8, further comprising:
receiving, by a wireless transmitter of each the one or more tactile feedback output devices, the one or more warning signals via a wireless network transmission from a warning system that transmits the one or more warning signals to the tactile feedback output devices only, the warning system translating the particular adverse behavior and percentage probability into the one or more warning signals.

13. The method according to claim 8, further comprising:
controlling, by a controller of each the one or more tactile feedback output devices, the one or more types of tactile output comprising one or more detectable pressure pulses with adjustable frequency, intensity, duration, and timing; and
specifying, by the controller, the positions of pulses within the one or more detectable pressure pulses and for specifying the frequency, intensity, duration, and timing of the pulses based on the one or more warning signals.

14. The method according to claim 8, further comprising:
receiving, by the one or more tactile feedback output devices, the one or more warning signals comprising x and y coordinates;
detecting, by the one or more tactile feedback output devices, a relative position of each of the one or more tactile feedback output devices compared with a force of gravity as the supervising user wears the one or more tactile feedback output devices; and
repositioning, by the one or more tactile feedback output devices, the one or more types of tactile outputs based on the x and y coordinates and the relative position of each of the one or more tactile feedback output devices compared with the force of gravity to maintain the y coordinate as up relative to the force of gravity.

15. A computer program product comprising one or more computer-readable storage devices and program instructions, stored on at least one of the one or more storage devices, the stored program instructions comprising:
program instructions to receive, by one or more tactile feedback output devices, one or more warning signals for controlling one or more types of tactile output by the one or more tactile feedback output devices, the one or more warning signals representing that a predicted behavior of a monitored user represents a particular behavior that is potentially adverse and a percentage probability that the predicted behavior is adverse, the monitored user detected within a particular environment monitored by a supervising user, the one or more tactile feedback output devices worn by the supervising user; and
program instructions to control, by one or more tactile feedback output devices, the one or more types of tactile outputs of the one or more tactile feedback output devices that are detectable by the supervising user wearing the one or more tactile feedback output devices according to the one or more warning signals to specifically alert the supervising user that the predicted behavior of the monitored user represents the particular behavior that is potentially adverse and the percentage probability that the predicted behavior is adverse.

16. The computer program product according to claim 15, wherein the program instructions further comprise:
program instructions to capture a three-dimensional movement of the monitored user within the particular environment monitored by the supervising user, wherein the three-dimensional movement is determined using at least one image capture device aimed at the monitored user;
program instructions to identify a three-dimensional object properties stream using the captured movement;

program instructions to access a selection of adverse behavior definitions specified for the particular environment from among a plurality of adverse behavior definitions specified for a plurality of environments from a behavior database;

program instructions to identify a particular defined adverse behavior of the monitored user represented by the three-dimensional object properties stream by comparing the identified three-dimensional object properties stream with the selection of adverse behavior definitions by calculating a percentage of probability that the captured three-dimensional movement represents the particular behavior defined in the selection of adverse behavior definitions and calculating the percentage of probability that the captured three-dimensional movement is adverse;

program instructions, in response to identifying the particular defined adverse behavior of the monitored user from among the plurality of adverse behavior definitions, to notify the supervising user for the particular environment about the particular defined adverse behavior of the monitored user through an interface only detectable by the supervising user by sending the one or more warning signals to the one or more tactile feedback output devices.

17. The computer program product according to claim 15, wherein the program instructions further comprise:

program instructions to translate the particular adverse behavior into the one or more warning signals comprising one or more tactile feedback control signals with a feedback strength specified to a percentage of total feedback strength to reflect the percentage probability that the captured three-dimensional movement is adverse and with a feedback position specified to one or multiple feedback positions to reflect a position of the monitored user of the particular adverse behavior within the particular environment; and program instructions to control output of the one or more warning signals comprising the one or more feedback control signals to the one or more tactile feedback output devices detectable by the supervising user only for controlling a feedback strength and a feedback position of the feedback output by the one or more tactile feedback output devices.

18. The computer program product according to claim 15, wherein the program instructions further comprise:

program instructions to receive, by a wireless transmitter for each of the one or more tactile feedback output devices, the one or more warning signals via a wireless network transmission from a warning system that transmits the one or more warning signals to the tactile feedback output devices only, the warning system translating the particular adverse behavior and percentage probability into the one or more warning signals.

19. The computer program product according to claim 15, wherein the program instructions further comprise:

program instructions to control, by a controller of each of the one or more tactile feedback output devices, the one or more types of tactile output comprising one or more detectable pressure pulses with adjustable frequency, intensity, duration, and timing; and program instructions to specify, by the controller, the positions of pulses within the one or more detectable pressure pulses and for specifying the frequency, intensity, duration, and timing of the pulses based on the one or more warning signals.

20. The computer program product according to claim 15, wherein the program instructions further comprise:

program instructions to receive, by the one or more tactile feedback output devices, the one or more warning signals comprising x and y coordinates;

program instructions to detect, by the one or more tactile feedback output devices, a relative position of each of the one or more tactile feedback output devices compared with a force of gravity as the supervising user wears the one or more tactile feedback output devices; and program instructions to reposition, by the one or more tactile feedback output devices, the one or more types of tactile outputs based on the x and y coordinates and the relative position of each of the one or more tactile feedback output devices compared with the force of gravity to maintain the y coordinate as up relative to the force of gravity.

* * * * *